United States Patent
Chan et al.

(10) Patent No.: US 10,011,694 B2
(45) Date of Patent: Jul. 3, 2018

(54) POLYIMIDE-CARBON NANOTUBE COMPOSITE FILM

(71) Applicant: Nanyang Technological University, Singapore (SG)

(72) Inventors: Bee Eng Mary Chan, Singapore (SG); Wei Yuan, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 15/424,448

(22) Filed: Feb. 3, 2017

(65) Prior Publication Data

US 2017/0145175 A1    May 25, 2017

Related U.S. Application Data

(62) Division of application No. 13/624,790, filed on Sep. 21, 2012, now Pat. No. 9,576,698.

(60) Provisional application No. 61/538,421, filed on Sep. 23, 2011.

(51) Int. Cl.
| | |
|---|---|
| *H01B 1/04* | (2006.01) |
| *C08J 5/18* | (2006.01) |
| *H01B 1/24* | (2006.01) |
| *H01B 3/30* | (2006.01) |
| *C08K 3/04* | (2006.01) |

(52) U.S. Cl.
CPC ........ *C08J 5/18* (2013.01); *C08K 3/04* (2013.01); *H01B 1/24* (2013.01); *H01B 3/306* (2013.01); *C08J 2379/08* (2013.01); *H01B 1/04* (2013.01)

(58) Field of Classification Search
CPC ....................................................... H01B 1/04
See application file for complete search history.

(56) References Cited

U.S. PATENT DOCUMENTS

| | | |
|---|---|---|
| 4,933,132 A | 6/1990 | Vora |
| 5,719,253 A | 2/1998 | Echigo et al. |
| 2012/0156459 A1 | 6/2012 | Lu et al. |

OTHER PUBLICATIONS

An et al., "Rod-like attapulgite/polyimide nanocomposites with simultaneously improved strength, toughness, thermal stability and related mechanisms," *Journal of Materials Chemistry* 18:4928-4941, 2008.

Baskaran et al., "Noncovalent and Nonspecific Molecular Interactions of Polymers with Multiwalled Carbon Nanotubes," *Chemistry of Materials* 17(13):3389-3397, 2005.

Blighe et al., "Observation of Percolation-like Scaling—Far from the Percolation Threshold—in High Volume Fraction, High Conductivity Polymer-Nanotube Composite Films," *Advanced Materials* 19:4443-4447, 2007.

Bryning et al., "Very Low Conductivity Threshold in Bulk Isotropic Single-Walled Carbon Nanotube-Epoxy Composites," *Advanced Materials* 17:1186-1191, 2005.

Chen et al., "2,6-Diamino-4-phenylphenol (DAPP) copolymerized polyimides: synthesis and characterization," *Polymer International* 55:93-100, 2006.

Chen et al., "A Versatile, Molecular Engineering Approach to Simultaneously Enhanced, Multifunctional Carbon Nanotube-Polymer Composites," *Advanced Functional Materials* 16:114-119, 2006.

(Continued)

*Primary Examiner* — William Young
(74) *Attorney, Agent, or Firm* — Seed IP Law Group LLP

(57) ABSTRACT

A polyimide-carbon nanotube composite film is provided. The composite film includes a carbon nanotube, and a polyimide obtainable by imidizing a poly(amic acid).

10 Claims, 14 Drawing Sheets

(56) References Cited

OTHER PUBLICATIONS

Chen et al., "Noncovalent Engineering of Carbon Nanotube Surfaces by Rigid, Functional Conjugated Polymers," *Journal of American Chemical Society* 124:9034-9035, 2002.

Clark et al., "Dispersion of Functionalized Multiwalled Carbon Nanotubes," *Journal of Physical Chemical C* 113(49):20861-20868, 2009.

Delozier et al., "Investigation of Aromatic/Aliphatic Polyimides as Dispersants for Single Wall Carbon Nanotubes," *Macromolecules* 39(5):1731-1739, 2006.

Garboczi et al., "Geometrical percolation threshold of overlapping ellipsoids," *Physical Review E* 52(1):819-828, Jul. 1995.

Grossiord et al., "High-Conductivity Polymer Nanocomposites Obtained by Tailoring the Characteristics of Carbon Nanotube Fillers," *Advanced Functional Materials* 18:3226-3234, 2008.

Gu et al., "Fabrication of Free-standing, Conductive, and Transparent Carbon Nanotube Films," *Advanced Materials* 20:4433-4437, 2008.

Hasan et al., "Stabilization and "Debundling" of Single-Walled Carbon Nanotube Dispersions in N-Methyl-2-pyrrolidone (NMP) by Polyvinylpyrrolidone (PVP)," *Journal of Physical Chemistry C* 111(34):12594-12602, 2007.

Ikeda et al., "Single-Walled Carbon Nanotubes Template the One-Dimensional Ordering of a Polythiophene Derivative," *Organic Letters* 8(24):5489-5492, 2006.

Isayev et al., "Ultrasound assisted twin screw extrusion of polymer-nanocomposites containing carbon nanotubes," *Polymer* 50:250-260, 2009.

Jiang et al., "Electrical and mechanical properties of polyimide-carbon nanotubes composites fabricated by in situ polymerization," *Polymer* 46:7418-7424, 2005.

Kim et al., "Synthesis of Polythiophene-graft-PMMA and Its Role as Compatibilizer for Poly(styrene-co-acrylonitrile)/MWCNT Nanocomposites," *Macromolecules* 40(10):3708-3713, 2007.

Lebrón-Colón et al., "Reinforced Thermoplastic Polyimide with Dispersed Functionalized Single Wall Carbon Nanotubes," *ACS Applied Materials & Interfaces* 2(3):669-676, 2010.

Lin et al., "Characterization of Fractions from Repeated Functionalization Reactions of Carbon Nanotubes," *Journal of Physical Chemical B* 107(4):914-919, 2003.

Liu et al., "Morphology and Mechanical Properties of Multiwalled Carbon Nanotubes Reinforced Nylon-6 Composites," *Macromolecules* 37(19):7214-7222, 2004.

Luo et al., "Flexible Carbon Nanotube—Polymer Composite Films with high Conductivity and Superhydrophobicity Made by Solution Process," *Nano Letters* 8(12):4454-4458, 2008.

Moniruzzaman et al., "Polymer Nanocomposites Containing Carbon Nanotubes," *Macromolecules* 39(16):5194-5205, 2006.

Muñoz et al., "Highly Conducting Carbon Nanotube/Polyethyleneimine Composite Fibers," *Advanced Materials* 17(8):1064-1067, Apr. 18, 2005.

Ogasawara et al., "Characterization of multi-walled carbon nanotube/phenylethynyl terminated polyimide composites," *Composites: Part A* 35:67-74, 2004.

Ramasubramaniam et al., "Homogenous carbon nanotube/polymer composites for electrical applications," *Applied Physics Letters* 83(14):2928-2930, Oct. 6, 2003.

Rao et al., "Evidence for charge transfer in doped carbon nanotube bundles from Raman scattering," *Nature* 388:267-269, Jul. 17, 1997.

Saini et al., "Electrical, Optical, and Morphological Properties of P3HT-MWNT Nanocomposites Prepared by in Situ Polymerization," *Journal of Physical Chemistry C* 113(19):8023-8029, 2009.

Smith et al., "Space durable polymer/carbon nanotube films for electrostatic charge mitigation," *Polymer* 45:825-836, 2004.

Spitalsky et al., "Carbon nanotube-polymer composites: Chemistry, processing, mechanical and electrical properties," *Progress in Polymer Science* 35:357-401, 2010.

Star et al., "Preparation and Properties of Polymer-Wrapped Single-Walled Carbon Nanotubes," *Angewandte Chemie International Edition* 40(9):1721-1725, 2001.

Sun et al., "Functionalized Carbon Nanotubes: Properties and Applications," *Accounts of Chemical Research* 35(12):1096-1104, 2002.

Tchoul et al., "Composites of Single-Walled Carbon Nanotubes and Polystyrene: Preparation and Electical Conductivity," *Chemistry of Materials* 20(9):3120-3126, 2008.

Tullos et al., "Unexpected thermal conversion of hydroxyl-containing polyimides to polybenzoxazoles," *Polymer* 40:3463-3468, 1999.

Wu et al., "Multi-walled carbon nanotube/polyimide composite film fabricated through electrophoretic deposition," *Polymer* 51:2155-2160, 2010.

Yan et al., "Functionalization of carbon nanotubes by argon plasma-assisted ultraviolet grafting," *Applied Physics Letters* 87:213101, 2005, 4 pages.

Yuan et al., "A Novel Polyimide Dispersing Matrix for Highly Electrically Conductive Solution-Cast Carbon Nanotube-Based Composite," *Chemistry of Materials* 23:4149-4157, 2011.

Yuan et al., "Preparation of polystyrene-multiwalled carbon nanotube composites with individual-dispersed nanotubes and strong interfacial adhesion," *Polymer* 50:3285-3291, 2009.

Yuan et al., "Use of Polyimide-graft-Bisphenol A Diglyceryl Acrylate as a Reactive Noncovalent Dispersant of Single-Walled Carbon Nanotubes for Reinforcement of Cyanate Ester/Epoxy Composite," *Chemistry of Materials* 22(24):6542-6554, 2010.

Yuen et al., "Poly(vinyltriethoxysilane) Modified MWCNT/Polyimide Nanocomposites—Preparation, Morphological, Mechanical, and Electrical Properties," *Science Part A: Polymer Chemistry* 46:803-816, 2008.

Yuen et al., "Preparation and Morphological, Electrical, and Mechanical Properties of Polyimide-Grafted MWCNT/Polyimide Composite," *Journal of Polymer Science Part A: Polymer Chemistry* 45:3349-335, 2007.

Zhou et al., "Polymeric nanocomposite films from functionalized vs suspended single-walled carbon nanotubes," *Polymer* 47:5323-5329, 2006.

Zhu et al., "Preparation and properties of the polyimide/multi-walled carbon nanotubes (MWNTs) nanocomposites," *Composites Science and Technology* 66:548-554, 2006.

Zou et al., "Dispersion of Pristine Carbon Nanotubes Using Conjugated Block Copolymers," *Advanced Materials* 20:2055-2060, 2008.

(A)

(V) + H₂N—R—NH₂ (VI)

(B)

(I) + CNTs (C)

(III) - CNT composite

POLYIMIDE-CARBON NANOTUBE COMPOSITE FILM

CROSS-REFERENCE TO RELATED APPLICATIONS

This application is a divisional application of U.S. application Ser. No. 13/624,790, filed Sep. 21, 2012, currently pending, which claims the benefit of priority of U.S. Provisional Application No. 61/538,421, filed Sep. 23, 2011, which applications are incorporated herein by reference in their entireties.

TECHNICAL FIELD

The invention relates to methods of forming a polyimide-carbon nanotube composite film and composite films formed thereof.

BACKGROUND

Polymer composites used in devices such as engines, ducts, machinery, and aircraft parts are often required to be electrically conductive, lightweight, structurally strong and stiff, so as to confer anti-static and electromagnetic shielding properties. In particular, polyimides (PIs) are an important class of structural polymers used in the microelectronics and aerospace industries, because of their outstanding thermal stability and mechanical properties. Carbon nanotubes (CNTs) have been considered to be a good additive for making high-performance conductive polymer composites because of their excellent electrical conductivity values in the range of about $10^3$ to $10^6$ S cm$^{-1}$, ultra-high strength, large aspect ratio, and low density. However, the electrical conductivities achieved in polyimide/CNT composites have typically been low, in the range of about $10^{-1}$ S cm$^{-1}$ for a nanotube/polyimide composite with 5 wt % nanotubes. Attempts to improve electrical conductivities of polyimide/CNT composites have been hampered by low CNT content (about 10 wt %) and poor dispersion of the CNTs.

Various research groups have carried out work to increase the electrical conductivity of CNT/polymer composites. Even though electrical conductivities in the range of 17 S cm$^{-1}$ to 200 S cm$^{-1}$ have been obtained in composites with a CNT content of more than 75 wt %, these materials employ special nanotubes and/or unconventional composite processing techniques, such as vacuum filtration or coagulation spinning, to result in high nanotube content and alignment, which leads to high processing costs and complicated processes which are not suitable for mass production.

Other composite processing techniques, such as casting and resin transfer molding, are not able to achieve the high carbon nanotubes loading. This in turn leads to low electrical conductivity of CNT/polymer composites formed using such methods, with most composites having conductivity values in the range of less than 1 S cm$^{-1}$.

In view of the above, there remains a need for an improved method for forming a polyimide-carbon nanotube composite that addresses at least one or some of the above-mentioned problems.

SUMMARY OF THE INVENTION

In a first aspect, the invention refers to a method for forming a polyimide-carbon nanotube composite film on a substrate. The method comprises a) suspending carbon nanotubes in a solution comprising a poly(amic acid) and a suitable solvent, the poly(amic acid) having the chemical formula (I)

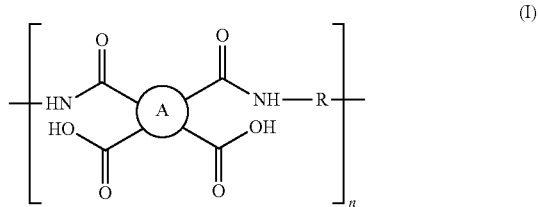

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20;

b) casting the solution onto a substrate to form a layer on the substrate; and c) heating the layer to convert the poly(amic acid) into a polyimide to form the polyimide-carbon nanotube composite film.

In a second aspect, the invention refers to a polyimide-carbon nanotube composite film formed by a method according to the first aspect.

In a third aspect, the invention refers to a polyimide-carbon nanotube composite film comprising carbon nanotubes and a polyimide having the chemical formula (III)

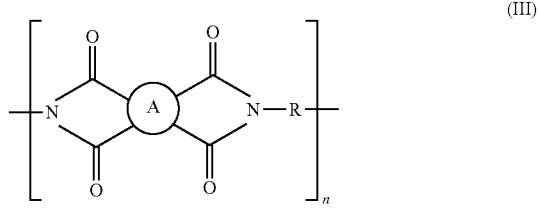

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20.

In a fourth aspect, the invention refers to an electronic device comprising a polyimide-carbon nanotube composite film according to the second aspect or the third aspect.

BRIEF DESCRIPTION OF THE DRAWINGS

The invention will be better understood with reference to the detailed description when considered in conjunction with the non-limiting examples and the accompanying drawings, in which.

DETAILED DESCRIPTION OF THE INVENTION

Figure 1:
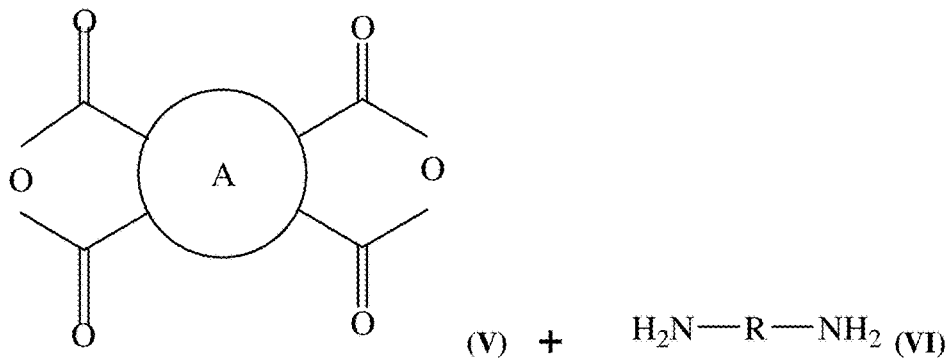
FIG. 1 depicts a general scheme for synthesizing poly (amic acid) (PAA), and subsequent fabrication of carbon nanotube-polyimide (CNT-PI) composites. As shown in (A), an aromatic dianhydride having chemical formula (V) is reacted with a diamine having chemical formula (VI). In various embodiments, the diamine is an aromatic diamine. In (B), a poly(amic acid) having chemical formula (I) is obtained, which is added to a suspension comprising carbon nanotubes and a suitable solvent. The suspension is casted on a substrate to form a layer on the substrate. The poly(amic acid) is imidized to a polyimide having chemical formula (III) to form a polyimide-carbon nanotube composite, as shown in (C).
Figure 1:
Figure 1:
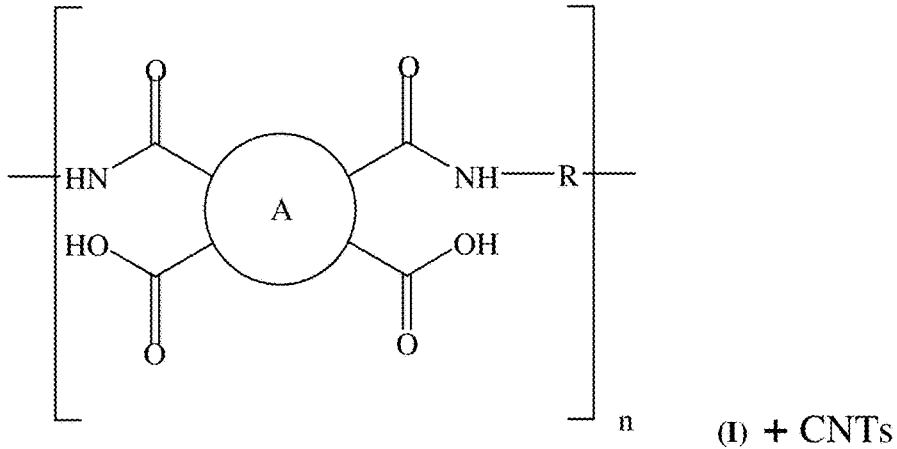
Figure 1:
Figure 1:
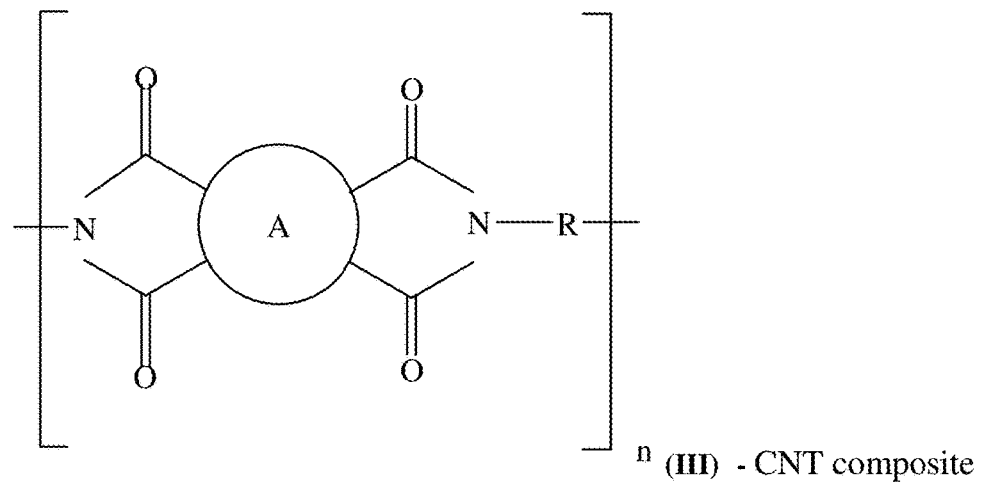

In a first aspect, the present invention refers to a method for forming a polyimide-carbon nanotube composite film. The method comprises a) suspending carbon nanotubes in a solution comprising a poly(amic acid) and a suitable solvent, the poly(amic acid) having the chemical formula (I)

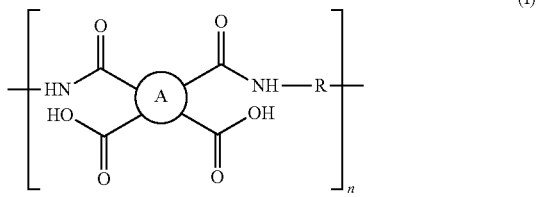

(I)

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20;

b) casting the solution onto a substrate to form a layer on the substrate; and c) heating the layer to convert the poly(amic acid) into a polyimide to form the polyimide-carbon nanotube composite film.

Through embodiments of the invention, it has been found that poly(amic acid) may serve a dual-role function as a carbon nanotubes dispersant and as a matrix or matrix precursor for polyimide-carbon nanotube composite formation. By using a single reagent, i.e. the poly(amic acid), as a dispersant to disperse the carbon nanotubes, with subsequent imidization of the poly(amic acid) to form the polyimide-carbon nanotube composite, there is improved compatibility between the carbon nanotubes and the polymer matrix. Furthermore, carbon nanotubes are prevented from aggregating during processing of the high carbon nanotube-content composites. Accordingly, polymer-carbon nanotube composites with high carbon nanotube content, such as in the range of about 30 wt %, may be derived.

In various embodiments of the methods and composites of the present invention, the composite does not contain a dispersant and/or matrix precursor besides the poly(amic acid) or the polyimide formed thereof. Thus, in various embodiments, the solution of the invented method comprising poly(amic acid) and a solvent consists essentially of or consists of poly(amic acid) and a solvent. In various embodiments, the solution can comprise one or more distinct poly(amic acids). Similarly, the composites of the present invention may, in various embodiments, consist essentially of or consist of the polyimide and the carbon nanotubes.

The term "polyimide" as used herein refers to a class of polymers having an imide group, i.e. a functional group consisting of two acyl groups bound to nitrogen. Polyimides may be based on stiff aromatic backbones. Due to their planar aromatic and hetero-aromatic structures, most polyimides are infusible and insoluble. Examples of polyimide include poly (4,4'-oxydiphenylene-pyromellitimide), poly (N,N'-p-phenylene biphenyltetracarboxylimide), and poly (N,N'-oxydiphenylene biphenyltetracarboxylimide), to name only a few.

Polyimides may generally be formed using a two-step poly(amic acid) process, whereby the first step includes reacting a dianhydride and a diamine at ambient conditions in a solvent such as N,N'-dimethylacetamide (DMAc) or N-methylpyrrolidinone (NMP) to obtain the corresponding poly(amic acid), which may be converted in a second step into the polyimide.

Examples of dianhydride that may be used include, but are not limited to, aromatic dianhydrides such as 3,3',4,4'-biphenyl tetracarboxylic dianhydride (BPDA), pyromellitic dianhydride (PMDA), 3,3',4,4'-diphenylsulfone tetracarboxylic dianhydride (DSDA), 3,3',4,4'-Benzophenone tetracarboxylic dianhydride (BTDA), 4,4'-oxydiphthalic dianhydride (ODPA), hydroquinone diphthalic anhydride (HQDA), and 4,4'-biphenol A dianhydride (BPADA).

In various embodiments, the dianhydride has the chemical formula (V)

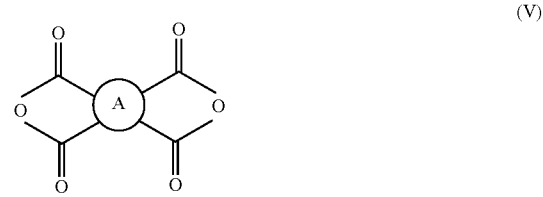

(V)

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20.

The term "monocyclic aryl" refers to a monocyclic aromatic carbon ring. Examples of monocyclic aryl groups may be, but are not limited to, phenyl and the like.

The term "condensed polycyclic aryl" refers to an aromatic carbon ring structure in which more than 1 monocyclic carbon rings are condensed or fused. Examples include naphthyl, anthracenyl, and phenanthryl.

The term "bridged aryl" refers to an aromatic carbon ring structure in which 1 aromatic carbon ring is connected to another aromatic carbon ring via a bridging group or atom, such as Si, O, S, or NH, or via a direct bond. Examples include biphenyl, triphenyl, phenyl-naphthyl, binaphthyl, diphenyl ether, diphenyl sulphide, diphenyl disulphide and the like.

The term "$C_5$-$C_{20}$", as used herein, means that the respective group has between 5 and 20 carbon atoms. In various embodiments, such a group is a $C_5$-$C_{14}$ aryl, a $C_6$-$C_{12}$ aryl, a $C_6$ aryl, a $C_{10}$ aryl, a $C_{12}$ aryl, or a $C_{14}$ aryl.

The term "5-20-membered heteroaryl" refers to an aromatic heterocycle. Heteroaryls may comprise at least one or more oxygen atoms or at least one or more sulphur atoms or one or more nitrogen atoms or a combination thereof. Examples of heteroaryl groups may be, but are not limited to, furan, benzofuran, thiophene, benzothiophene, pyrrole, pyridine, indole, oxazole, benzoxazole, isoxazole, benzisoxazole, thiazole, benzothiazole, imidazole, benzimidazole, pyrazole, indazole, tetrazole, quinoline, isoquinoline, pyridazine, purine, pyrazine, furazan, triazole, benzotriazole, pteridine, phenoxazole, oxadiazole, benzopyrazole, quinolizine, cinnoline, phthalazine, quinazoline or quinoxaline, and the like.

The terms "monocyclic", "condensed polycyclic" and "bridged" in "5-20-membered monocyclic, condensed polycyclic or bridged heteroaryl" have the same definition as that as defined above for $C_5$-$C_{20}$ aryl, but applied in this case to 5-20-membered heteroaryl.

The term "5 to 20-membered", refers to the number of ring atoms including carbon and heteroatoms. In various embodiments, the number of ring atoms is from 5-14, from 5-12 or from 6-10.

The term "substituted or unsubstituted straight-chain or branched $C_1$-$C_{10}$ alkyl" refers to a fully saturated aliphatic hydrocarbon. Whenever it appears here, a numerical range, such as 1 to 10 or $C_1$-$C_{10}$ refers to each integer in the given range, e.g. it means that an alkyl group comprises only 1 carbon atom, 2 carbon atoms, 3 carbon atoms etc. up to and including 10 carbon atoms. Examples of alky groups may be, but are not limited to, methyl, ethyl, n-propyl, isopropyl, n-butyl, isobutyl, s-butyl, t-butyl, n-hexyl, n-heptyl, n-octyl, n-nonyl or n-decyl and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted straight-chain or branched $C_2$-$C_{10}$ alkenyl" refers to an aliphatic hydrocarbon having one or more carbon-carbon double bonds. Examples of alkenyl groups may be, but are not limited to, ethenyl, propenyl, allyl or 1,4-butadienyl and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted straight-chain or branched $C_2$-$C_{10}$ alkynyl" refers to an aliphatic hydrocarbon having one or more carbon-carbon triple bonds. Examples of alkynyl groups may be, but are not limited to, ethynyl, propynyl, butynyl, and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted $C_3$-$C_{10}$ cycloalkyl" refers to a group comprising a non-aromatic ring (i.e. an alicyclic ring) wherein each of the atoms forming the ring is a carbon atom. The $C_3$-$C_{10}$ cycloalkyl may be formed by three, four, five, six, seven, eight, nine, or ten carbon atoms. Examples of $C_3$-$C_{10}$ cycloalkyl include cyclopropane, cyclobutane, cyclopentane, cyclohexane, cycloheptane, among others. Exemplary substituents include $C_1$-$C_{10}$ alkoxy, $C_5$-$C_{20}$ aryl, $C_5$-$C_{20}$ aryloxy, sulfhydryl, $C_5$-$C_{20}$ arylthio, halogen, hydroxyl, amino, sulfonyl, carbonyl, nitro, cyano, and carboxyl.

The term "substituted or unsubstituted $C_3$-$C_{10}$ heterocycloalkyl" has the general above definition of "$C_3$-$C_{10}$ cycloalkyl", except in the alicyclic ring at least one of the carbon atom in the ring is substituted with a heteroatom. Heteroatoms are typically independently selected from oxygen, sulfur, nitrogen, and phosphorus, but are not limited to those atoms. The $C_3$-$C_{10}$ heterocycloalkyl may be formed by three, four, five, six, seven, eight, nine, or ten atoms.

Examples of $C_3$-$C_{10}$ heterocycloalkyls include, but are not limited to, lactams, lactones, cyclic imides, cyclic thioimides, cyclic carbamates. Exemplary substituents include alkoxy, aryl, aryloxy, sulfhydryl, arylthio, halogen, hydroxyl, amino, carbonyl and carboxyl.

In one embodiment, the dianhydride is 3,3',4,4'-biphenyl tetracarboxylic dianhydride (BPDA), when X is a direct bond.

The dianhydride may be reacted with a diamine at ambient conditions in a suitable solvent to obtain the corresponding poly(amic acid). Examples of diamine include, but are not limited to aromatic diamines such as 3,3'-dihydroxy-4,4'-diaminobiphenyl (HAB), 3,3'-diamino-4,4'-dihydroxydiphenyl ether, 3,3'-diamino-4,4'-dihydroxydiphenylsulfone, 3,3'-diamino-4,4'-dihydroxybiphenyl, 1,3-hexafluoro-2,2-bis(3-amino-4-hydroxyphenyl)propane, 2,2-bis(3-amino-4-hydroxyphenyl)propane, and 9,9'-bis(3-amino-4-hydroxyphenyl)fluorine.

In various embodiments, the diamine has the chemical formula (VI)

$$H_2N-R-NH_2 \qquad (VI)$$

wherein R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl. In various embodiments, R is nothing, substituted or unsubstituted monocyclic, condensed or bridged $C_5$-$C_{20}$ aryl. In some embodiments, R is a (hetero)aryl substituted with at least one hydrophilic group, for example selected from a carboxylic acid or hydroxyl group. In various embodiments, R may be a carboxyl substituted or a hydroxyl substituted aryl. The aryl may be a monocyclic aryl, such as phenyl, a polycyclic aryl, such as naphthyl, or a bridged aryl, such as biphenyl.

In one embodiment, the diamine is 3,3'-dihydroxy-4,4'-diaminobiphenyl (HAB), when R is

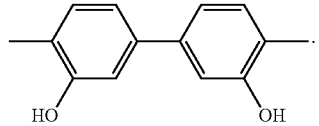

A solvent may be used to facilitate the reaction between the dianhydride and the diamine. The dianhydride and the diamine may at least be substantially dissolved in the solvent. The solvent may be a dipolar aprotic solvent. For example, the solvent may be N-N'-dimethylacetamide (DMAc), N,N-dimethylformamide (DMF), N-methylpyrrolidinone (NMP), tetrahydrofuran (THF), acetone, dimethyl sulfoxide (DMSO), and mixtures thereof. In one embodiment, the solvent is N-N'-dimethylacetamide (DMAc).

The dianhydride and the diamine may be added to the solvent separately in any order, or be added together. In various embodiments, a diamine such as HAB may first be dissolved in a solvent such as N-N'-dimethylacetamide (DMAc), before a dianhydride such as 3,3',4,4'-biphenyl tetracarboxylic dianhydride (BPDA) is added to the solution.

The poly(amic acid) obtained may have the chemical formula (I)

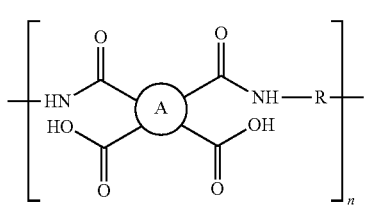

(I)

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20.

In various embodiments, the poly(amic acid) has the chemical formula (II)

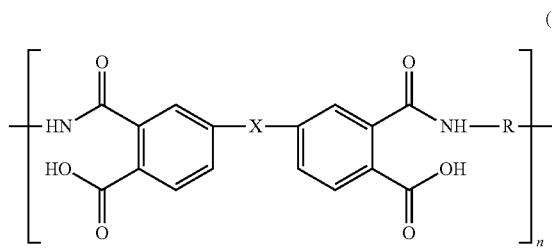

(II)

wherein X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_5$-$C_{10}$ aryl, and a heteroatom selected from oxygen, sulfur and nitrogen; R is nothing, a substituted or unsubstituted monocyclic, condensed or bridged $C_5$-$C_{20}$ aryl; and n is an integer of at least 20.

The term "substituted or unsubstituted $C_5$-$C_{10}$ aryl" refers to an aromatic ring, wherein each of the atoms forming the ring is a carbon atom. Aromatic in this context means a group comprising a covalently closed planar ring having a delocalized π-electron system comprising 4w+2π-electrons, wherein w is an integer of at least 1, for example 1, 2, 3 or 4. Examples of aryl groups may be, but are not limited to, phenyl, napthalenyl, phenanthrenyl, anthracenyl, tetralinyl, fluorenyl, indenyl, and indanyl, and the like.

The term "heteroatom" refers to an atom other than carbon present in a main chain of a hydrocarbon. For example, a heteroatom may be selected from oxygen, sulfur or nitrogen.

In various embodiments, X is a direct bond. R may be a carboxyl substituted aryl or a hydroxyl substituted aryl. For example, R may be

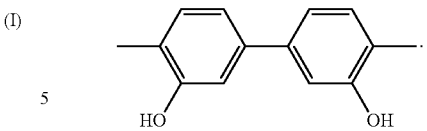

Carbon nanotubes may be suspended in the solution comprising the poly(amic acid) and the solvent. Alternatively, the carbon nanotubes may first be suspended in a solvent to form a suspension, prior to addition of the poly(amic acid) into the suspension. The poly(amic acid) according to various embodiments may have a rigid and unbent backbone to facilitate stacking of the poly(amic acid) molecules onto the conjugated carbon nanotubes surface via π-π interaction, which promotes adsorption of poly(amic acid) molecules on the carbon nanotubes. The poly(amic acid) thus acts as a good dispersant to disperse the carbon nanotubes. Furthermore, by interacting non-covalently with the poly(amic acid) molecules via π-π interaction, the carbon nanotubes are provided with the pendent —OH and —COOH groups on the poly(amic acid) molecules, which impart solubility to the carbon nanotubes in organic solvents, for example, and prevent the nanotubes from reaggregation.

It has been found by the inventors that use of poly(amic acid) having higher molecular weights to form the polymer-carbon nanotubes composite are advantageous as they allow more contact points between the polymer molecules and the carbon nanotubes to increase the carbon nanotubes dispersion efficacy. The molecular weight of the poly(amic acid) formed may depend on factors such as reaction temperature and the concentration of the monomer. For example, the poly(amic acid) formation may be exothermic, thereby favoring equilibrium at lower temperatures. Accordingly, process for forming poly(amic acid) may be carried at ambient conditions to result in a high molecular weight poly(amic acid). Concentration of the dianhydride and the diamine may also be varied to affect the molecular weight of the poly(amic acid) formed. For example, the dianhydride and the diamine may be reacted in stoichiometric amounts to obtain poly(amic acid) with a high molecular weight. Generally, increasing the monomer concentration favors high molecular weight products.

In various embodiments, the molecular weight of the poly(amic acid) may be in the range of about $1 \times 10^5$ g/mol to about $2.5 \times 10^5$ g/mol, such as about $1.5 \times 10^5$ g/mol to about $2 \times 10^5$ g/mol or about $2 \times 10^5$ g/mol. In one embodiment, the molecular weight of the poly(amic acid) is about $2 \times 10^5$ g/mol.

The carbon nanotubes that are suspended in the solution comprising a poly(amic acid) and a solvent may be single-walled (SWNT) or double-walled (DWNT) or multi-walled carbon nanotubes (MWNT). A single-walled nanotube may be defined by a cylindrical sheet with a diameter of about 0.7 nm to about 10 nm or 20 nm, or with a diameter of less than 20 nm or less than 2 nm. They may be several micrometer long, i.e. at least 1 μm or at least 2 μm or between about 1 μm and 5 μm. Single-walled carbon nanotubes can be described as a graphite plane, or graphene sheet, rolled into a hollow cylindrical shape so that the structure is one-dimensional with axial symmetry, and in general exhibiting a spiral conformation, called chirality. Double-walled or multi-walled nanotubes consist of numerous cylinders tightly stuck into another. In various embodiments, the carbon nanotubes comprise multi-walled carbon nanotubes.

The use of carbon nanotubes as electrode material may provide a high electrical conductivity of at least or about 2000 S/cm, which is important for electron transport. In addition, thin layers of carbon nanotubes can be formed as transparent electrode and thus provide transparency in visible and infrared wavelength range. At the same time, layers of carbon nanotubes provide good mechanical and thermal properties and can be manufactured to be flexible. Carbon nanotubes are also solution processable and are thus compatible with printing techniques for fabrication.

The amount of carbon nanotubes in the solution may range from about 0.1 wt % to about 30 wt %, such as about 5 wt % to about 30 wt %, about 10 wt % to about 30 wt %, about 20 wt % to about 30 wt %, or about 30 wt %. Advantageously, a method of forming polyimide-carbon nanotube composite film according to embodiments of the first aspect allows a high loading of carbon nanotubes and formation of a uniform film on a substrate. This translates into good conductivity and mechanical properties in the resultant film.

The method of the first aspect may include agitating the solution after carbon nanotubes have been suspended therein to disperse the carbon nanotubes in the solution. For example, agitating may comprise sonicating the solution. In various embodiments, sonicating the solution is carried out for more than 5 minutes, such as about 10 minutes, 20 minutes or 30 minutes.

After the carbon nanotubes are suspended in solution, the solution is casted onto a substrate to form a layer on the substrate. The casting may be carried out by any standard casting technique or thin film forming technique, such as by a spin coating machine. In one embodiment, the reaction mixture is casted on a solid support such as a casting glass plate.

The method of the first aspect further includes heating the layer to convert the poly(amic acid) into a polyimide to form the polyimide-carbon nanotube composite film. Heating of the layer may be carried out in a two stage process, to first dry the layer by removing the solvent, and subsequently to imidize the poly(amic acid) to polyimide. The heating may be carried out in an inert gas environment, such as under argon.

Depending on the solvent used, for example, the drying temperature may range from between about 50° C. to about 100° C., such as about 50° C. to about 80° C. or about 80° C. The drying temperature may depend on the solvent used, for example. The temperature to imidize the poly(amic acid) may range from between about 100° C. to about 350° C. In various embodiments, the imidization is carried out using a stepwise approach. For example, the layer may be heated using a gradual stepwise increase in temperature from 100° C., to 200° C., to 300° C. and to 350° C. The time and temperature for the imidization process may vary depending on the poly(amic acid) used and the thickness of the layer, for example. In one embodiment, heating of the layer on the substrate includes drying the layer at a temperature of about 50° C. to about 100° C. to remove the solvent, and heating the layer at a temperature of about 100° C. to about 350° C. to imidize the poly(amic acid) to polyimide.

The polyimide that is formed after heating may have the chemical formula (III)

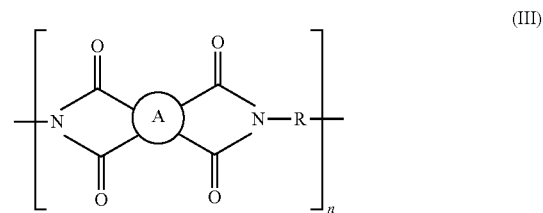

(III)

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20.

In various embodiments, the polyimide has the chemical formula (IV)

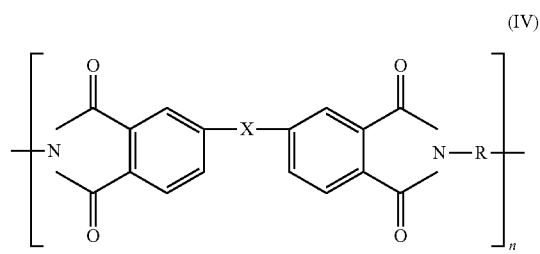

(IV)

wherein X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_5$-$C_{10}$ aryl, and a heteroatom selected from oxygen, sulfur and nitrogen; R is nothing, a substituted or unsubstituted monocyclic, condensed or bridged $C_5$-$C_{20}$ aryl; and n is an integer of at least 20.

In various embodiments, X is a direct bond.

In various embodiments, R is a (hetero)aryl substituted with at least one hydrophilic group, for example selected from a carboxylic acid or hydroxyl group. In various embodiments, R can be a carboxyl substituted aryl or a hydroxyl substituted aryl. The aryl may be a monocyclic aryl, such as phenyl, a polycyclic aryl, such as naphthyl, or a bridged aryl, such as biphenyl. In any case, the aryl is preferably oriented such, that it is linked to the polymer chain via the 1,4-positions (phenyl), via the 1,6-positions (naphthyl), and via the 1,4,4',1'-positions (biphenyl). In one embodiment, R is

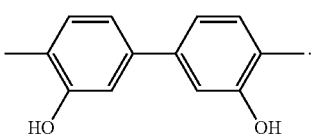

In other embodiments, one or both of the —OH groups in this formula may be replaced by carboxylic acid groups or other hydrophilic groups, such as amino.

In one embodiment, the polyimide comprises

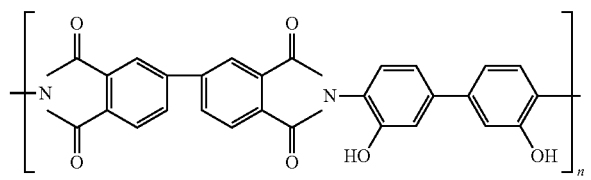

In a further aspect, the invention refers to a polyimide-carbon nanotube composite film formed by the method of the first aspect. The invention also refers, in a third aspect, to a polyimide-carbon nanotube composite film comprising carbon nanotubes and a polyimide having the chemical formula (III)

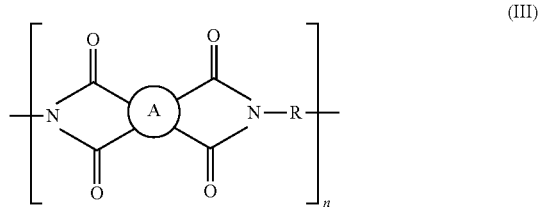

wherein A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20.

In various embodiments, the polyimide has the chemical formula (IV)

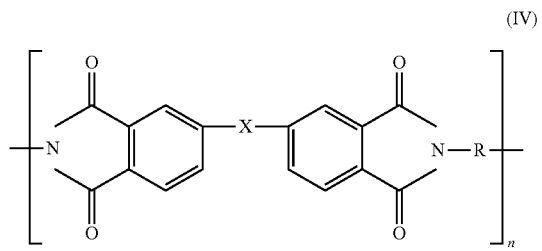

wherein X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_5$-$C_{10}$ aryl, and a heteroatom selected from oxygen, sulfur and nitrogen; R is nothing, a substituted or unsubstituted monocyclic, condensed or bridged $C_5$-$C_{20}$ aryl; and n is an integer of at least 20.

In various embodiments, X is a direct bond. R may be a carboxyl substituted aryl or a hydroxyl substituted aryl. For example, R may be

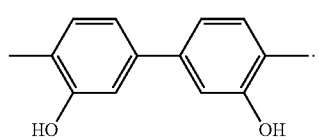

In various embodiments, the polyimide comprises

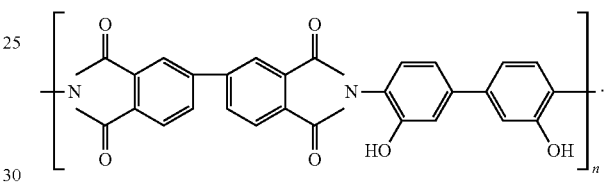

Highly electrically conductive composites may be achieved if the carbon nanotubes content is high and the nanotubes are well-dispersed within the polymer matrix. In various embodiments, the carbon nanotubes comprise multi-walled carbon nanotubes. The amount of carbon nanotubes in the composite may range from about 0.1 wt % to about 30 wt %, such as about 5 wt % to about 30 wt %, about 10 wt % to about 30 wt %, about 20 wt % to about 30 wt %, or about 30 wt %. Advantageously, a polyimide-carbon nanotube composite film according to embodiments allows a high loading of carbon nanotubes and formation of a uniform film on a substrate. This translates into good conductivity and mechanical properties in the resultant film.

To debundle and disperse the carbon nanotubes as individual tubes, covalent and non-covalent approaches may be used. In various embodiments, the polyimide interacts non-covalently with the carbon nanotubes. As mentioned above, the poly(amic acid) according to various embodiments may have a rigid and unbent backbone to facilitate stacking of the poly(amic acid) molecules onto the conjugated carbon nanotubes surface via π-π interaction, which promotes adsorption of poly(amic acid) molecules on the carbon nanotubes and which serves to disperse the nanotubes. Furthermore, by interacting non-covalently with the poly(amic acid) molecules via π-π interaction, the carbon nanotubes are provided with the pendent —OH and —COOH groups on the poly(amic acid) molecules, which impart solubility to the carbon nanotubes in organic solvents, for example, and prevent the nanotubes from reaggregation. The presence of only non-covalent interaction between polyimide and carbon nanotubes is advantageous in that it preserves the graphene structure of the nanotubes and consequently, their intrinsic electrical and mechanical properties. By subsequently imidizing the poly(amic acid) to form polyimide, these advantages translated on to the polyimide-carbon nanotube composite film.

In a fourth aspect, the invention relates to an electronic device comprising a polyimide-carbon nanotube composite film according to the second aspect or the third aspect.

The polyimide-carbon nanotube composite film according to various aspects of the invention may be used to manufacture an electrode, such as an electrode for a supercapacitor; or a sensor; or a hybrid electrochemical device; or a rechargeable battery; or a metal-air battery. These, in turn, may find applications in high performance microelectronics, such as in flexible printed circuit boards, and aerospace applications.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1: Materials

MWNTs with a diameter of 10 nm to 15 nm and a length of 10 μm to 20 μm were supplied by Iljin Nano Tech, Korea. They were purified via thermal oxidation at 350° C. for 2 h in air, followed by refluxing in 6 M HCl solution overnight. 3,3'-Dihydroxy-4,4'-diaminobiphenyl (HAB, 97%) was purchased from Tokyo Chemical Industry and purified by recrystallization from N,N'-dimethylformamide (DMF)/ethanol mixture. 3,3',4,4'-biphenyltetracarboxylic dianhydride (BPDA), poly(vinyl pyrrolidone) (PVP, Mw=29 000), N,N'-dimethylacetamide (DMAc), and all other chemicals were obtained from Sigma-Aldrich. BPDA was purified via sublimation under reduced pressure. DMAc was distilled over calcium hydride. All other chemicals were used without purification.

Example 2: Synthesis of Poly(amic acid) (PAA)

FIG. 1 depicts a process scheme for synthesizing poly(amic acid) (PAA), and subsequent fabrication of MWNT/polyimide composites.

Typically, a solution of HAB (2.16 g, 10 mmol) in freshly distilled DMAc (51 mL) was added into a 100-mL three-necked flask under flowing argon. After the HAB was completely dissolved, BPDA (2.94 g, 10 mmol) was added at 0° C. and the mixture was mechanically stirred at room temperature for 24 h. The resulting viscous PAA solution was kept in a freezer until use. The molecular weight of PAA determined by GPC was $M_w$=1.97×10$^5$ g/mol with a polydispersity index of 1.96.

Example 3: Fabrication of MWNT/PI Composite Films

A measured quantity of MWNTs was added into DMAc (the concentration of MWNTs in DMAc was fixed at 1 mg/mL), and the mixture was sonicated with a high-power tip sonicator (500 W, 35%, Vibra-Cell Sonics) for 5 min. Different quantities of PAA solution then were mixed with the MWNT/DMAc suspension and sonicated with the tip sonicator for another 5 min, followed by further sonication in a low-power sonication bath (S30H, Elma) for 30 min at 0° C.

Figure 3:
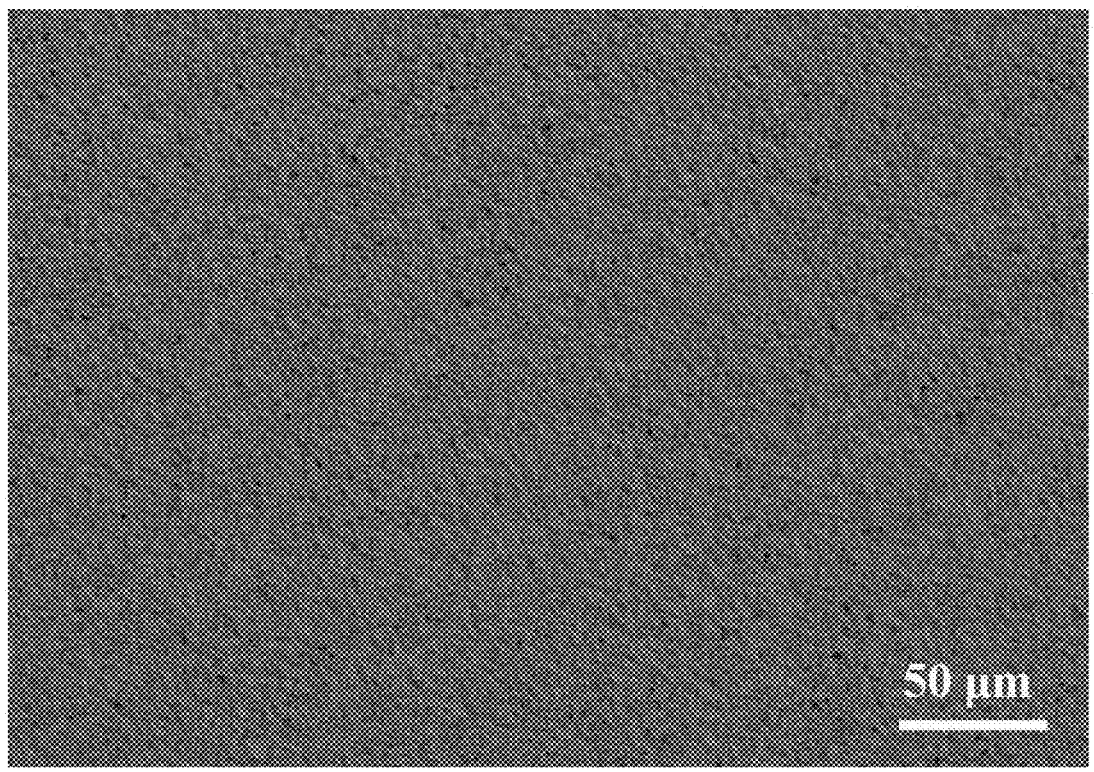
FIG. 3 is an optical micrograph of multi-walled carbon nanotubes/poly(amic acid) (MWNT/PAA) thin film solution-cast from MWNT (30 wt %)/PAA dispersion after removal of some DMAc. No obvious nanotube aggregates were observed by eye and via optical microscopy (200× magnification). The scale bar denotes a length of 50 μm.

MWNT/PAA dispersions with <10 wt % MWNTs were directly cast into films. Dispersions with 10 wt % to 30 wt % MWNTs were prepared with a large amount of DMAc, some of which was slowly evaporated in a glass dish before film casting. No obvious nanotube aggregates were observed by eye and via optical microscopy (200× magnification) (see FIG. 3) during this process.

The MWNT/PAA dispersions were cast onto glass slides, which were heated on a hot plate at 50° C. After the removal of most of the DMAc, the glass slides were transferred to a vacuum oven and dried at 80° C. under vacuum for 3 h to remove residual solvent. Finally, the as-prepared MWNT/PAA films were imidized under argon at 100° C. for 2 h, 200° C. for 1 h, 300° C. for 1 h, and 350° C. for 20 min. The thickness of the resulting films was measured to be 15±1 μm. The MWNT volume fraction was computed from its mass fraction, based on the MWNT true density (2.15 g cm$^{-3}$) and the polyimide density (1.4 g cm$^{-3}$).

Example 4: Fabrication of MWNT/PI Composite Coatings

Ultrathin MWNT/PAA coatings on the glass and aluminum substrates were fabricated from MWNT (30 wt %)/PAA dispersion (nanotube concentration of 0.1 mg/mL) using an air brush (Badger, model 100LG).

During the spray process, the substrates were kept on a hot plate at about 170° C., in order to accelerate the evaporation of DMAc. The nozzle was kept at a distance of 20 cm to 30 cm from the substrates, and the dispersion was sprayed, one spray at a time, onto the substrates. A thick MWNT (30 wt %)/PAA coating on the aluminum was prepared by solution casting. MWNT/PI coatings were obtained after thermal imidization.

Example 5: Characterization $^1$H NMR spectra of PAA and MWNTs/PAA were obtained with a Bruker Avance 300 NMR spectrometer, using deuterated dimethylsulfoxide (DMSO-d$_6$) as the solvent and tetramethylsilane as the internal standard.

The weight average molecular weight ($M_w$) and polydispersity (PDI) of poly(amic acid) was measured via gel permeation chromatography (GPC) that was performed with a Shimadzu LC-20A Series GPC system equipped with a pump, a BC-PL gel mixed column, and a RID-10A refractive index detector, using DMF with 0.02 M LiBr as eluent and polystyrene standards as reference.

Raman characterization was carried out on a Renishaw Ramanscope with HeNe laser at an excitation wavelength of 633 nm.

The absorption spectra of PAA- or PVP-dispersed MWNT dispersions, and the transmittance of an ultrathin composite coating on glass, were measured by a Varian Cary 5000 UV-vis-NIR spectrophotometer.

Atomic force microscopy (AFM) was conducted, using a MFP 3D microscope in ac mode. A pristine MWNT suspension or MWNT/PAA (mass ratio=1:2) dispersion in DMAc was prepared via sonication and then deposited onto a clean silicon wafer by spin coating.

High-resolution transmission electron microscopy (TEM) images were obtained using a JEOL Model 3010F analytical electron microscope operating at an accelerating voltage of 300 kV. TEM samples were prepared by placing several drops of pristine MWNT suspension or MWNT/PAA (mass ratio=1:2) dispersion in DMAc on a carbon-coated copper grid and drying at room temperature.

Field-emission scanning electron microscopy (FE-SEM) analysis was performed with a JEOL Model JSM-6700F microscope operating at 5 kV.

Composite films were fractured in liquid nitrogen, and the cryofractured surfaces were sputter-coated with gold. Tensile tests of cast films were conducted with an Instron Model 5543 mechanical tester at ambient temperature, with a gauge length of 20 mm and a crosshead speed of 2 mm/min. At least five specimens from each batch were tested.

Electrical conductivity was measured by a two-probe method using Keithley Model 610C and 2636A electrometers at room temperature. Silver paste was applied onto two ends of measured samples to ensure good contact between the electrodes and the sample.

Example 6: Design and Synthesis of PAA

Figure 2:
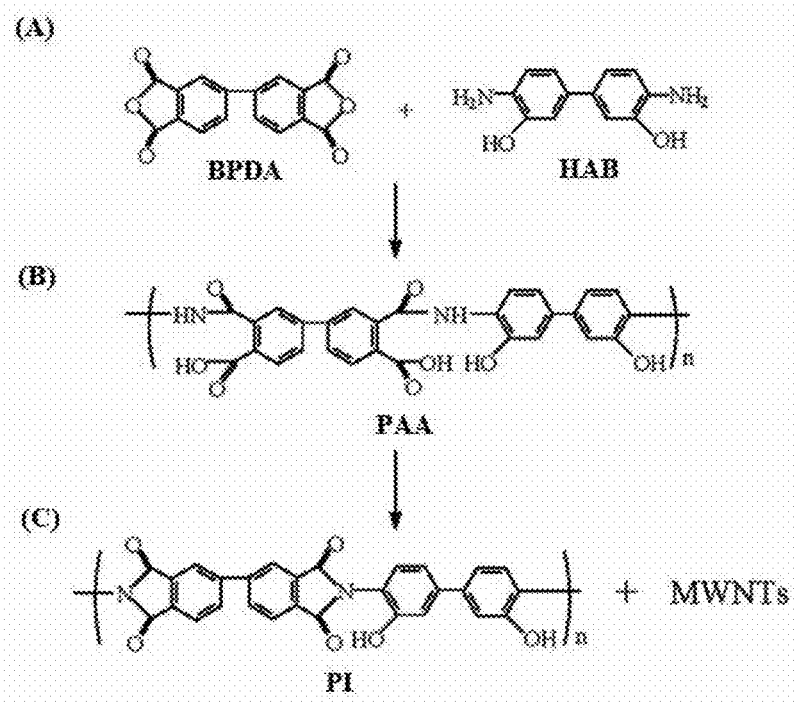
FIG. 2 depicts an exemplified scheme for synthesizing poly(amic acid) (PAA), and subsequent fabrication of carbon nanotube-polyimide (CNT-PI) composite. As shown in (A), 3,3',4,4'-biphenyltetracarboxylic dianhydride (BPDA) is reacted with 3,3'-dihydroxy-4,4'-diaminobiphenyl (HAB). In (B), a poly(amic acid) is obtained, which is added to a suspension comprising carbon nanotubes and N,N'-dimethylacetamide (DMAc). The suspension is casted on a substrate to form a layer on the substrate. The poly(amic acid) is imidized to a polyimide to form a polyimide-carbon nanotube composite, as shown in (C).

The PAA (FIG. 2) was synthesized from HAB and BPDA, using stoichiometric amounts of these compounds to achieve the highest molecular weight possible. High molecular weight enables more contact points between the polymer molecules and CNTs, to increase the CNT dispersion efficacy. The biphenyl diamine and dianhydride polymerize to a rigid and unbent PAA backbone, which facilitates the stacking of the dispersant molecules onto the conjugated MWNT surface via π-π interaction, to promote PAA adsorption and produce a relatively strong bond between the dispersant and the MWNTs. The pendent —OH and —COOH groups provide the functionalized MWNTs with good solubility in organic solvents and a polymer matrix precursor.

Figure 4:
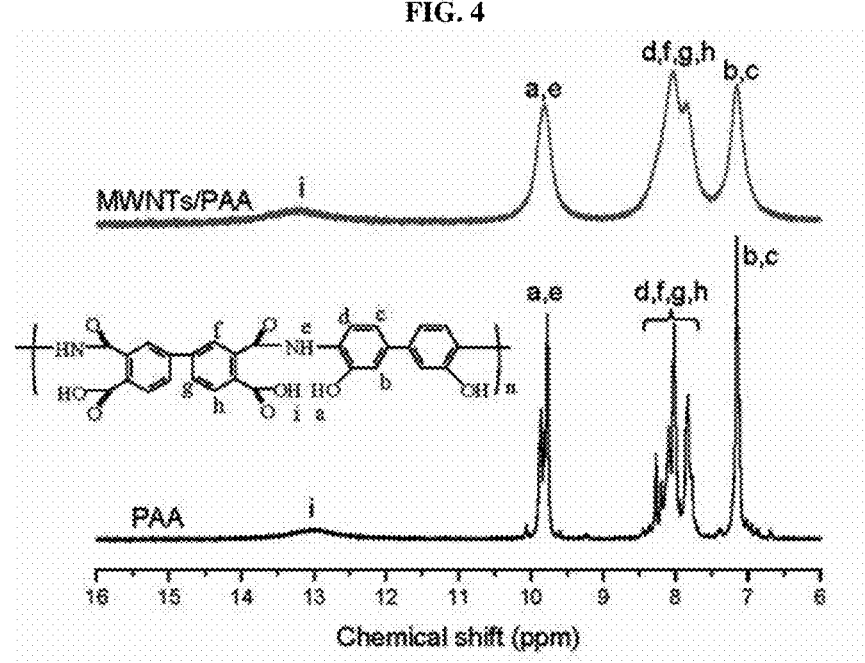
FIG. 4 is a graph showing $^1$H NMR spectra of PAA and MWNTs/PAA (mass ratio of 1:2) in DMSO-$d_6$. The $^1$H NMR spectrum of PAA in DMSO-$d_6$ confirms its successful synthesis with the characteristic aromatic proton peaks at δ 7.1 ppm to 7.2 ppm (peaks b and c) and 7.8 ppm to 8.3 ppm (peaks d, f, g, and h), the phenolic —OH and —NH protons peaks at δ 9.7 ppm to 9.9 ppm (peaks a and e) and the —COOH proton peak at δ 13.0 ppm (peak i).

FIG. 4 is a graph showing $^1$HNMR spectra of PAA and MWNTs/PAA (mass ratio of 1:2) in DMSO-$d_6$. The $^1$H NMR spectrum of PAA in DMSO-$d_6$ confirms its successful synthesis with the characteristic aromatic proton peaks at δ 7.1 ppm to 7.2 ppm (peaks b and c) and 7.8 ppm to 8.3 ppm (peaks d, f, g, and h), the phenolic —OH and —NH protons peaks at δ 9.7 ppm to 9.9 ppm (peaks a and e) and the —COOH proton peak at δ 13.0 ppm (peak i). Interaction with the nanotube π cloud is known to cause $^1$H NMR signal broadening. Such broadening is evident in the MWNTs/PAA (mass ratio=1:2) spectrum.

To investigate the strong interaction between MWNTs and PAA, PAA-dispersed MWNT dispersion was filtered through a 0.2-μm PTFE membrane, and washed several times with large quantity of DMAc to remove any free or weakly adsorbed PAA. Then the solid (denoted as MWNT/PAA complex) was collected and dried before FT-IR characterization.

Figure 5:
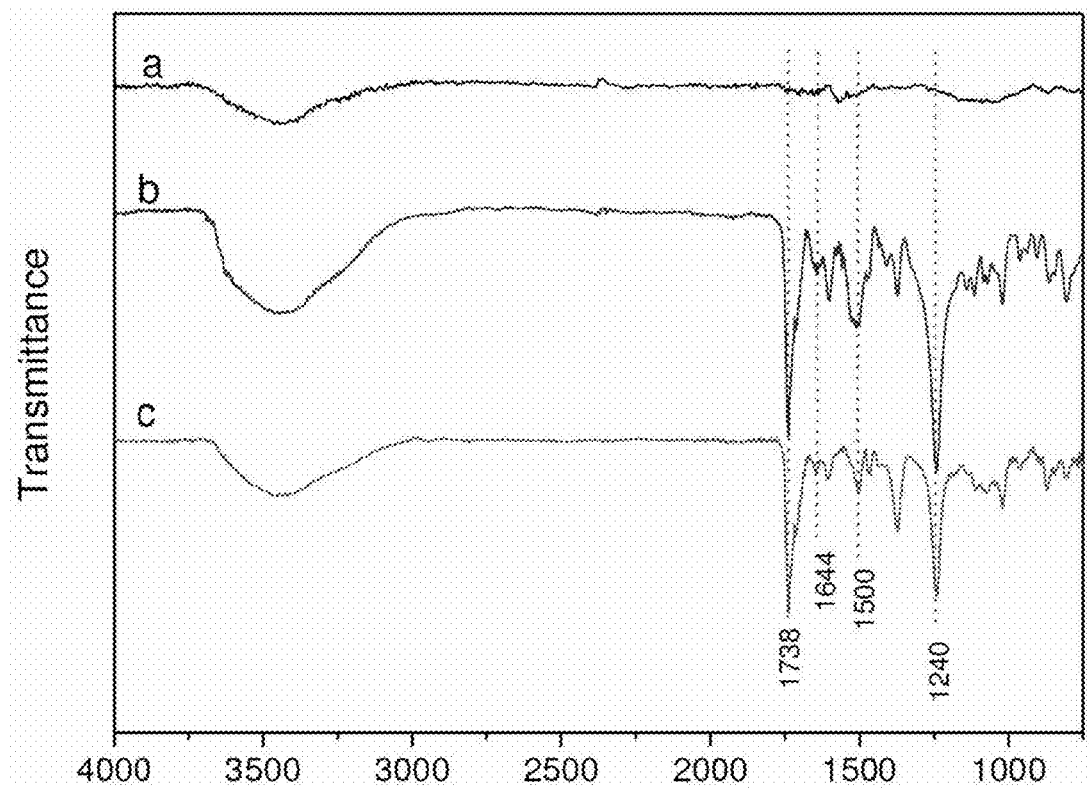
FIG. 5 is a graph showing Fourier transform infrared spectroscopy (FTIR) spectra of (a) MWNTs, (b) PAA and (c) MWNT/PAA complex. From the graph, it can be seen that the characteristic absorption features of PAA (1738 cm$^{-1}$ for C=O(OH) stretching, 1644 cm$^{-1}$ for C=O(NH) stretching, 1500 cm$^{-1}$ for phenyl ring C—C stretching, and 1240 cm$^{-1}$ for C—O stretching) still appear in the MWNT/PAA complex after washing, indicating that the interaction between PAA and MWNTs is so strong that some PAA can not be washed away by DMAc, which is a good solvent for PAA.

FIG. 5 is a graph showing FT-IR spectra of (a) MWNTs, (b) PAA and (c) MWNT/PAA complex. It can be clearly seen that the characteristic absorption features of PAA (1738 cm$^{-1}$ for C=O(OH) stretching, 1644 cm$^{-1}$ for C=O(NH) stretching, 1500 cm$^{-1}$ for phenyl ring C—C stretching, and 1240 cm$^{-1}$ for C—O stretching) still appear in the MWNT/PAA complex after washing, indicating that the interaction between PAA and MWNTs is so strong that some PAA cannot be washed away by DMAc, which is a good solvent for PAA.

Figure 6:
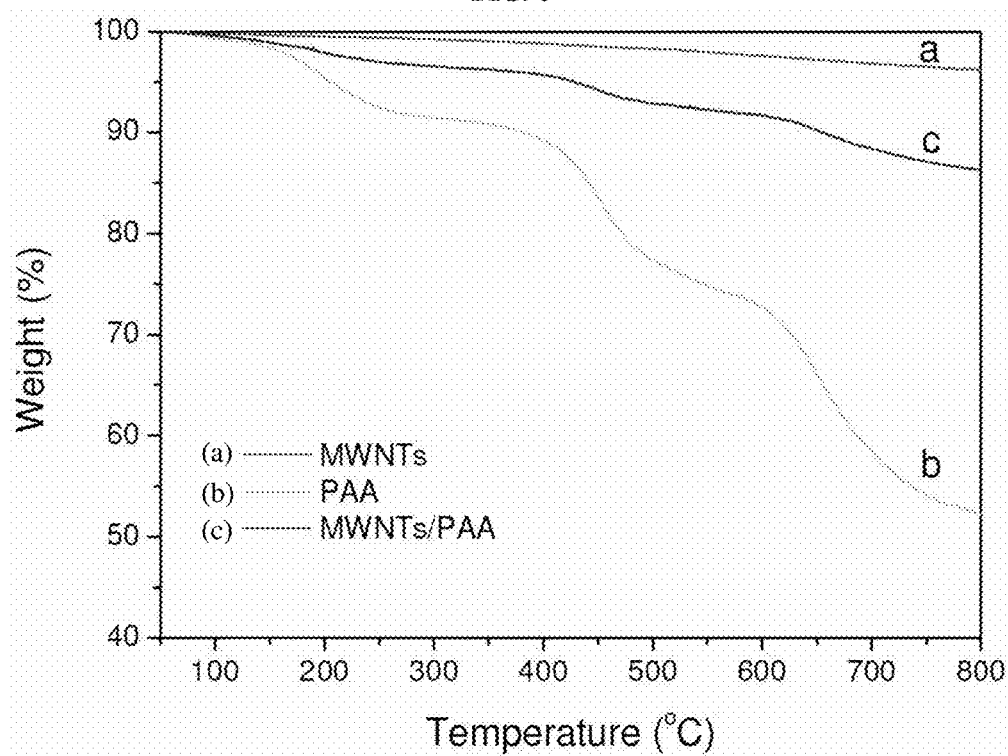
FIG. 6 is a graph showing thermogravimetric analysis (TGA) curves of (a) MWNTs, (b) PAA, and (c) MWNT/PAA complex under nitrogen ($N_2$). The percentage of PAA that cannot be washed away was calculated to be about 23% from TGA.

FIG. 6 is a graph showing thermogravimetric analysis (TGA) curves of (a) MWNTs, (b) PAA and (c) MWNT/PAA complex under nitrogen ($N_2$). The MWNT/PAA complex is the same sample used in FT-IR characterization. The percentage of PAA that cannot be washed away was calculated to be about 23% from TGA.

Figure 7:
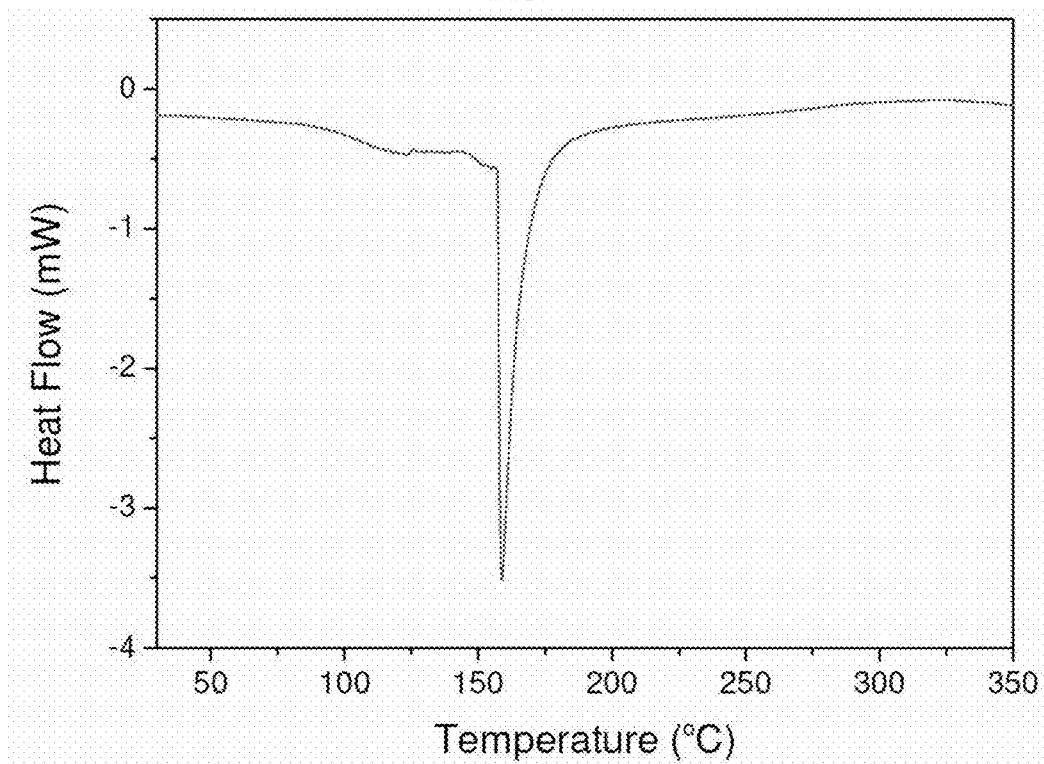
FIG. 7 is a graph showing differential scanning calorimetry (DSC) curve of PAA film. The DSC curve of PAA film shows that the imidization process mainly occurs in the temperature range of 150° C. to 180° C.

PAA converts to PI after thermal imidization. The DSC of PAA film was performed on a Mettler Toledo DSC 822e instrument under $N_2$ at a heating rate of 5° C./min from 25 to 350° C. FIG. 7 is a graph showing differential scanning calorimetry (DSC) curve of PAA film. The differential scanning calorimetry (DSC) curve of PAA film shows that the imidization process mainly occurs in the temperature range of 150° C. to 180° C., which is covered by the heating range (from 100° C. to 350° C.). The heating temperature was 350° C. to maximize the degree of imidization. Further heating to 400° C. should be avoided, because the —OH groups in PI can result in thermal conversion of PI to polybenzoxazole upon heating over this temperature in an inert atmosphere. There is no observation of cross-linking reaction between pendant —OH groups, which is possibly due to the strong steric hindrance.

Example 7: Dispersion of MWNTs/PAA in DMAc

Figure 8:
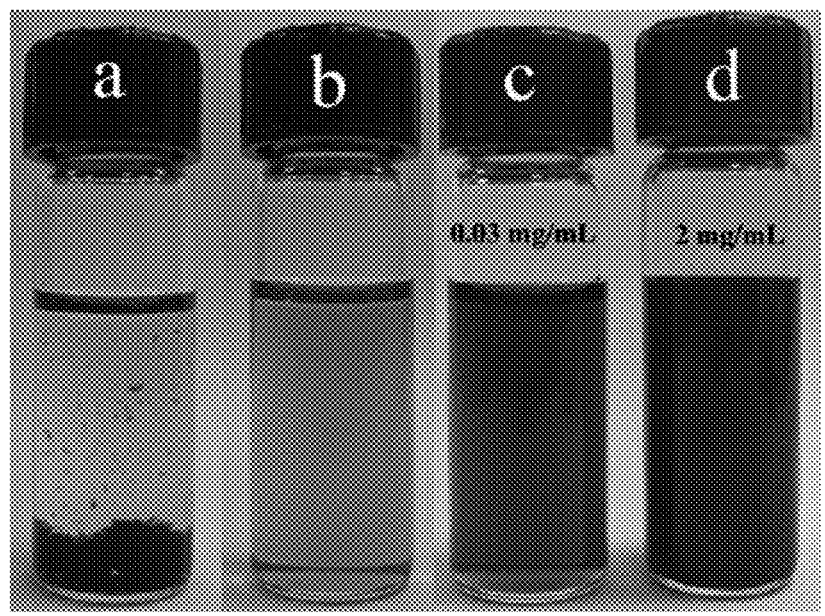
FIG. 8 is a series of photographs showing (a) pristine MWNTs, (b) PAA solution, (c and d) PAA-functionalized MWNT dispersions, (e and f) MWNT/PI composite films with nanotube loadings of 0.25 wt % (panel e), and 30 wt % (panel f), and (g and h) MWNT/PI coatings on glass substrates (panel g) and aluminum substrates (panel h).
Figure 8:
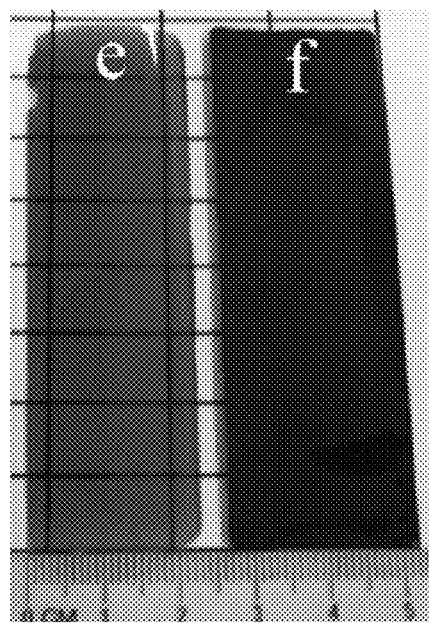
Figure 8:
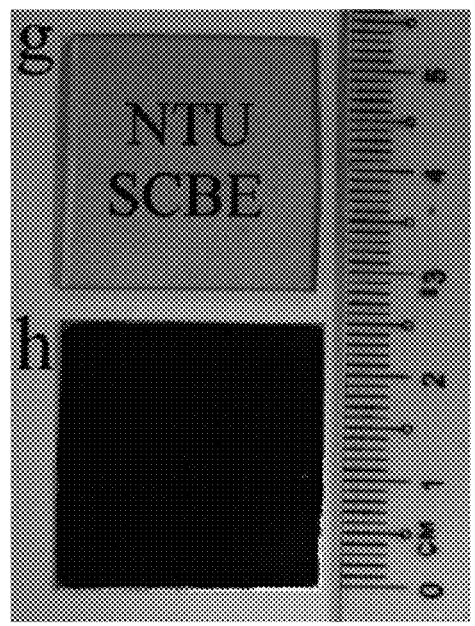

FIG. 8 is a series of photographs showing (a) pristine MWNTs, (b) PAA solution, (c and d) PAA-functionalized MWNT dispersions, (e and f) MWNT/PI composite films with nanotube loadings of 0.25 wt % (panel e), and 30 wt % (panel f), and (g and h) MWNT/PI coatings on glass substrates (panel g) and aluminum substrates (panel h).

When pristine MWNTs are dispersed in DMAc and allowed to stand for one week, the MWNTs mostly settle at the bottom of the vial (see FIG. 8, vial a). The addition of PAA (FIG. 8, vial b) results in homogeneous dispersions of MWNTs/PAA without visible aggregates anywhere in the vial, even after several months of standing (FIG. 8, vials c and d). The maximum MWNT concentration that can be dispersed with PAA was determined to be about 2.8 mg/mL, which is comparable to the highest reported values with other dispersants (2.5 mg/mL to 3 mg/mL).

The efficacy of PAA at dispersing MWNTs in DMAc was quantitatively evaluated and compared with that of poly (vinyl pyrrolidone) (PVP), which is a commercially available dispersant for nanotubes, through absorbance measurements and the Beer-Lambert law. Nanotube concentration can be determined by the Beer-Lambert law, $$A = \varepsilon l c \qquad \text{Equation (1)}$$

where A is the absorbance at a particular wavelength, ε the extinction coefficient, l the light path length (l=1 cm for the cell used), and c the nanotube concentration.

Figure 9:
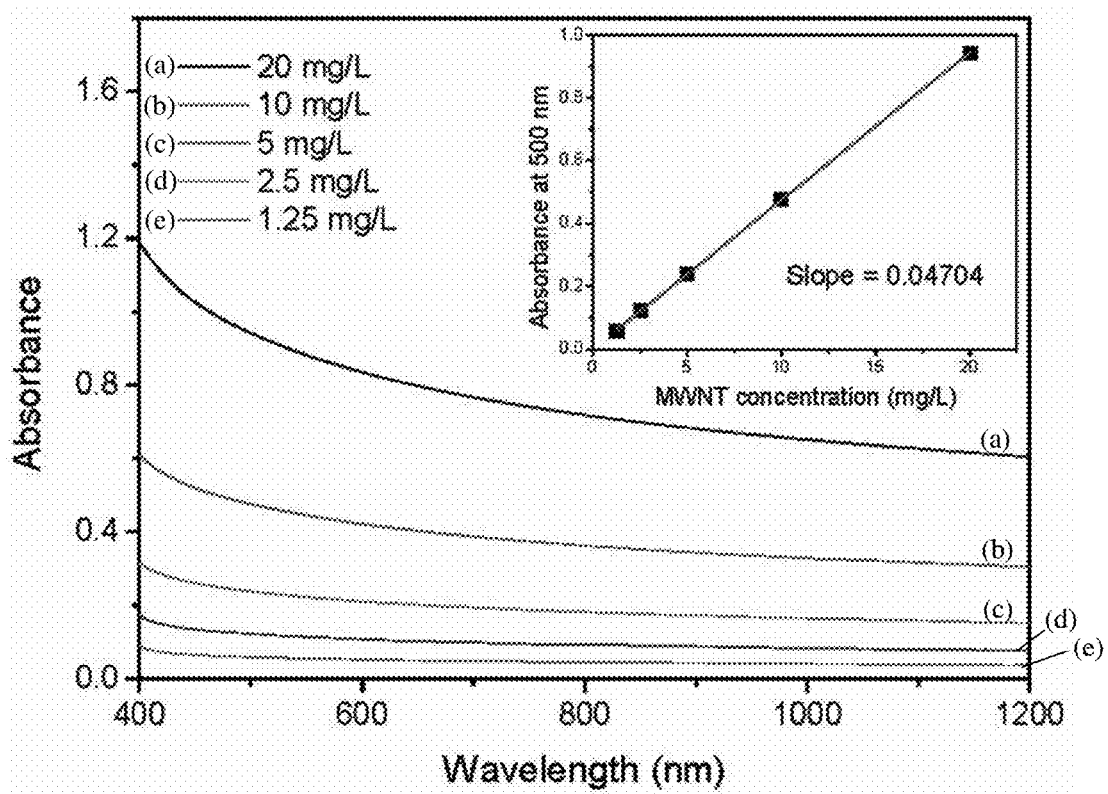
FIG. 9 is a graph showing absorption spectra of MWNTs/PAA (mass ratio=1:2) in DMAc at different nanotube concentrations. Inset shows the absorbance of these dispersions at 500 nm. The straight line is a linear-least-squares fit to the data.

To determine the value of ε, the absorbance spectra of very dilute and well-dispersed MWNT/PAA (mass ratio 1:2) dispersions at different concentrations were measured and the absorbance at 500 nm was plotted against nanotube concentrations. FIG. 9 is a graph showing absorption spectra of MWNTs/PAA (mass ratio=1:2) in DMAc at different nanotube concentrations. Inset shows the absorbance of these dispersions at 500 nm. The straight line is a linear-least-squares fit to the data. The linear-least-squares fit to the data gave a slope of 0.04704, so the extinction coefficient was calculated to be 0.04704 $Lmg^{-1}cm^{-1}$, which is in agreement with those found at 500 nm for MWNTs in chloroform (0.04220 $Lmg^{-1}cm^{-1}$) and o-dichlorobenzene (0.04600 $Lmg^{-1}cm^{-1}$).

Figure 10:
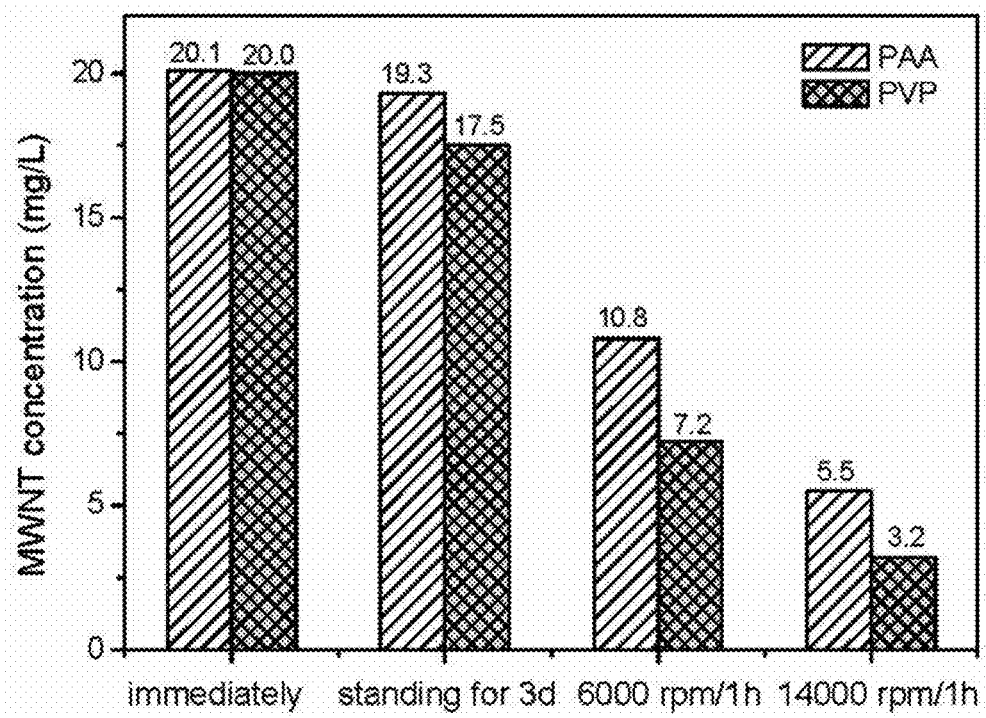
FIG. 10 is a graph comparing MWNT concentrations of MWNTs/PAA (mass ratio=1:2) and multi-walled carbon nanotubes/poly(vinyl pyrrolidone) (MWNTs/PVP) (mass ratio=1:2) under different conditions: immediately after sonication, after standing for 3 days, after centrifugation at 6000 rpm for 1 h, and after centrifugation at 14 000 rpm for 1 h.

The nanotube concentrations of MWNTs/PAA (mass ratio=1:2) and MWNTs/PVP (mass ratio=1:2) under different conditions, determined using absorbance at 500 nm and the Beer-Lambert law, are shown in FIG. 10, which is a graph comparing MWNT concentrations of MWNTs/PAA (mass ratio=1:2) and MWNTs/PVP (mass ratio=1:2) under different conditions: immediately after sonication, after standing for 3 days, after centrifugation at 6000 rpm for 1 h, and after centrifugation at 14 000 rpm for 1 h.

Immediately after sonication, both MWNTs/PAA and MWNTs/PVP have nanotube concentrations of about 20.0 mg/L. After standing for 3 days, centrifugation at 6000 rpm for 1 h and centrifugation at 14 000 rpm for 1 h, the nanotube concentration of MWNTs/PAA decreases to 19.3 mg/L, 10.8 mg/L, and 5.5 mg/L, respectively, which is higher than that of MWNTs/PVP (17.5 mg/L, 7.2 mg/L, and 3.2 mg/L, respectively), suggesting higher efficacy of our PAA than PVP at dispersing MWNTs in DMAc.

Figure 11:
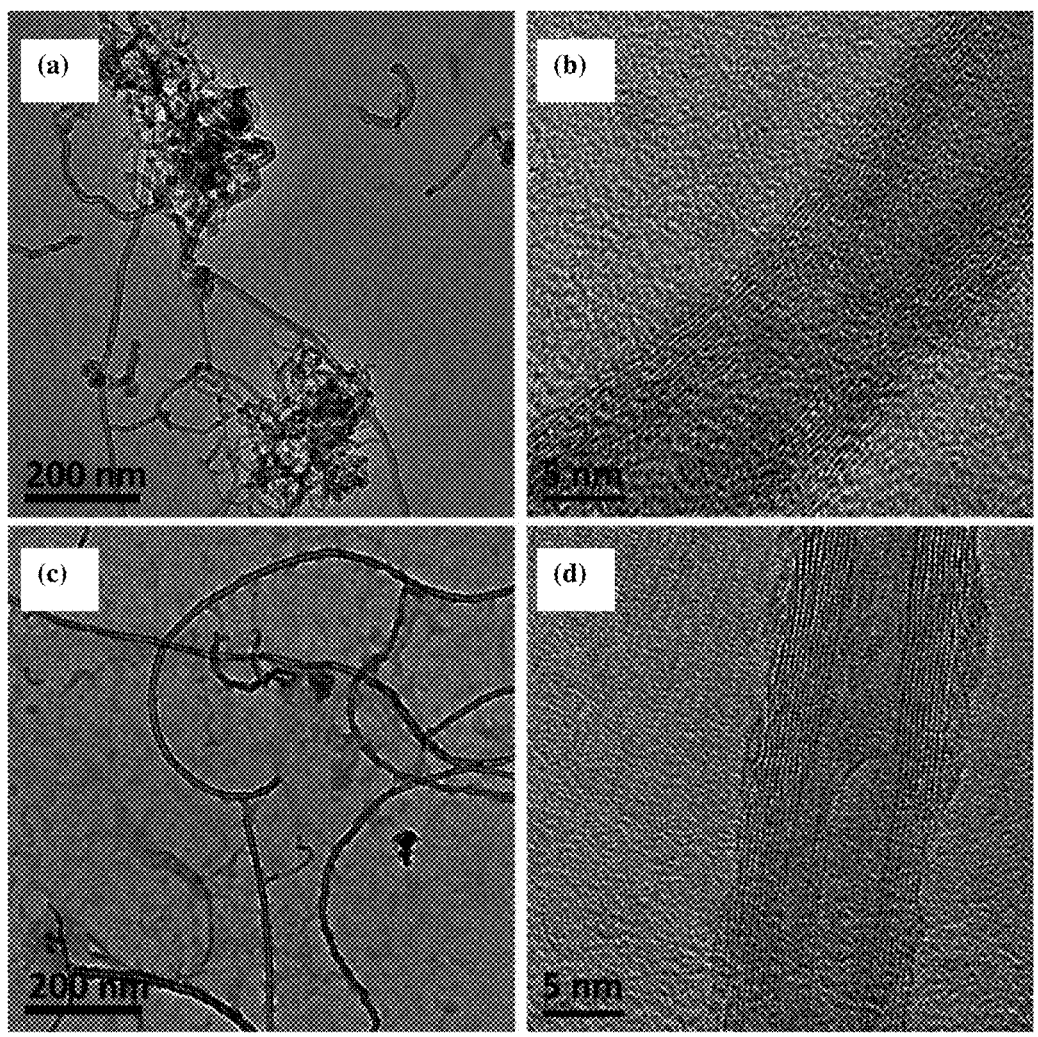
FIG. 11 are transmission electron microscopy (TEM) images of (a and b) pristine MWNTs, and (c and d) PAA-dispersed MWNTs. The scale bar in (a) and (c) denotes a length of 200 nm, and the scale bar in (b) and (c) denotes a length of 5 nm.

FIG. 11 are transmission electron microscopy (TEM) images of (a and b) pristine MWNTs, and (c and d) PAA-dispersed MWNTs, which further show the high efficacy of PAA at dispersing MWNTs. Pristine MWNTs, which are used as controls, form large aggregates (see FIG. 11a), while the majority of the PAA-dispersed MWNTs are observed as individual tubes (see FIG. 11c). At the higher magnification, the pristine MWNT surface is quite clean (see FIG. 11b), while there is an amorphous coating layer with a thickness of 1 nm to 2 nm in MWNTs/PAA (see FIG. 11d). This feature of FIG. 11d is postulated to be a layer of PAA that has self-assembled onto the nanotube surface, which contributes to long-term stability and individually dispersed MWNTs.

Figure 12:
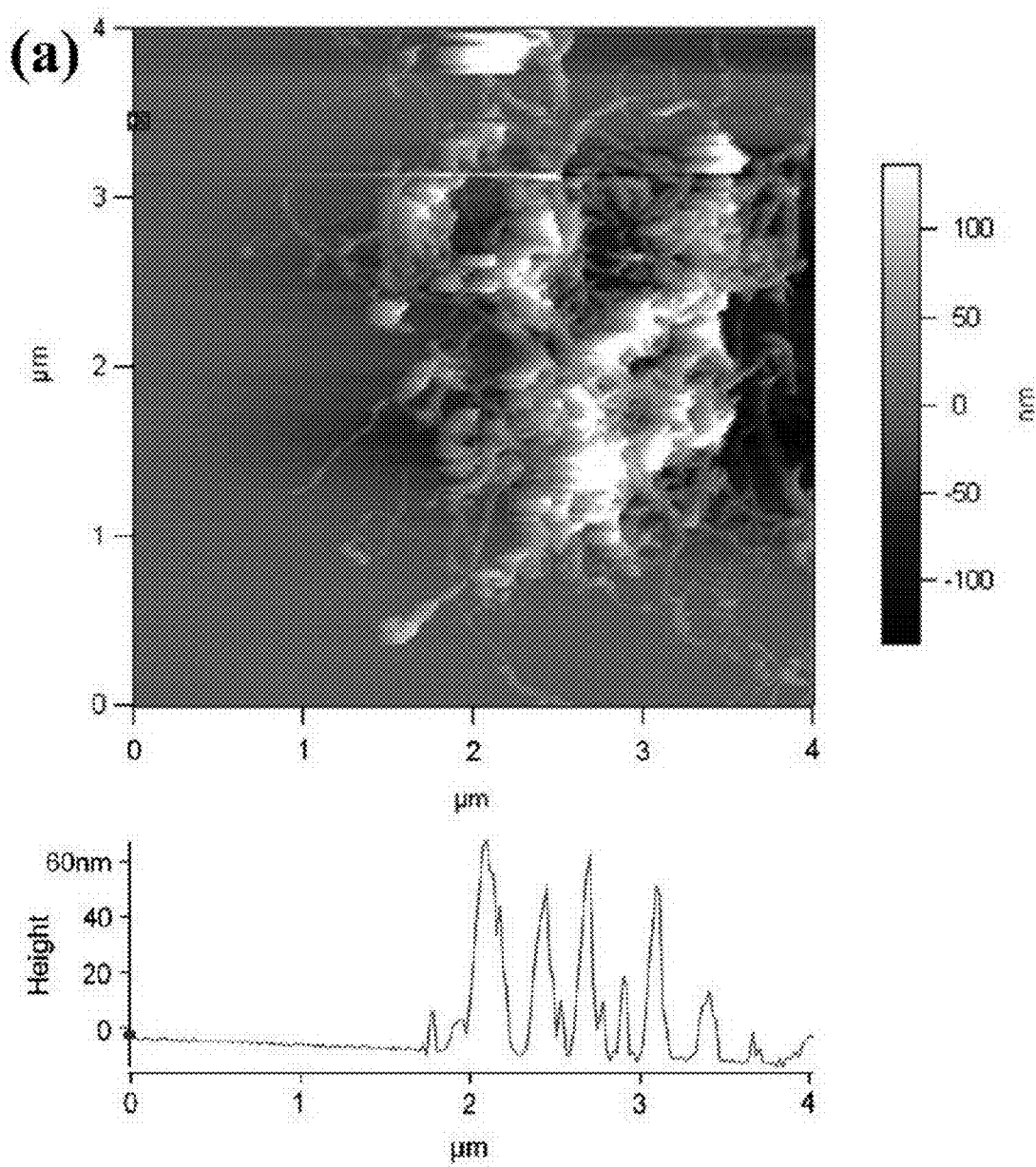
FIG. 12 are atomic force microscopy (AFM) images of (a) pristine and (b) PAA-dispersed MWNTs deposited on silicon wafers by spin coating.
Figure 12:
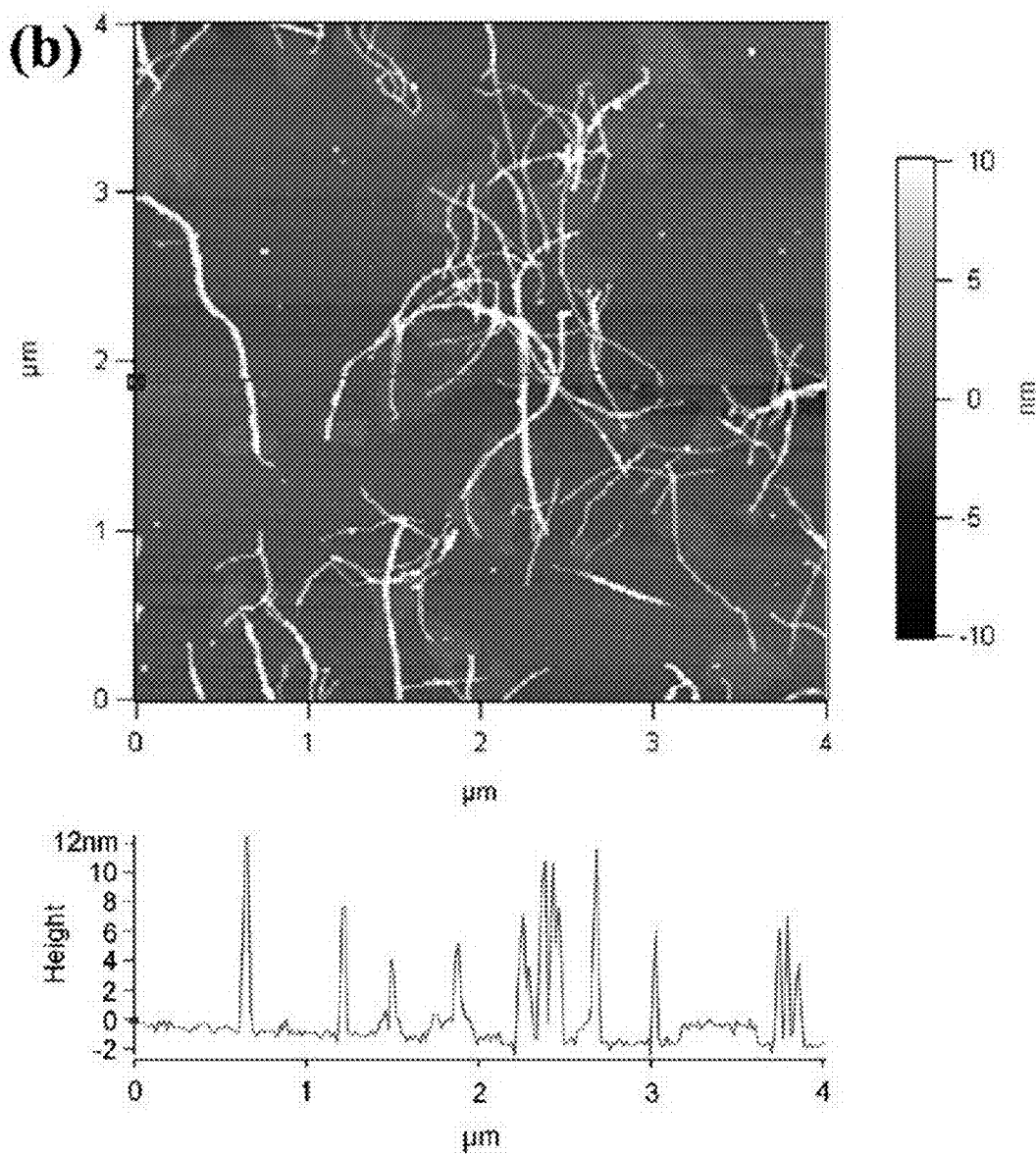

FIG. 12 are atomic force microscopy (AFM) images of (a) pristine and (b) PAA-dispersed MWNTs deposited on silicon wafers by spin coating. The capability of PAA at dispersing MWNTs into individual tubes was also manifested by the AFM image.

As shown in FIG. 12, most of the PAA-dispersed MWNTs have lengths of >2 μm, indicating that noncovalent functionalization of MWNTs with PAA does not significantly reduce the nanotube length.

The measured height of the MWNTs is in the range of 8 nm to 15 nm, which is close to the diameter of pristine MWNTs (10 nm to 15 nm), suggesting that the MWNTs are dispersed as individual tubes. We attribute the high efficacy of PAA at dispersing MWNTs to its unique structure. The rigid unbent highly aromatic backbone of PAA has a strong affinity via π-π interaction to the highly conjugated graphene-like surface of nanotubes, while the pendent —COOH and —OH groups provide MWNTs with solubility and keep them from reaggregation.

Example 8: MWNT Dispersion and MWNT-PI Interfacial Bonding in Composite Films

Figure 13:
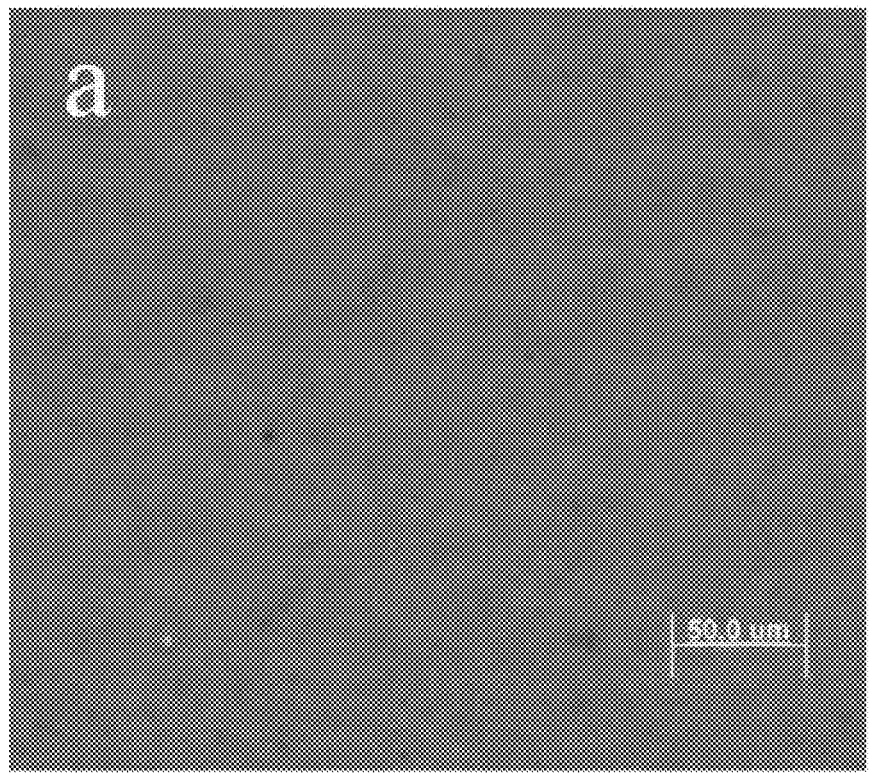
FIG. 13 are optical micrographs of MWNT/PI composite films with MWNT loadings of (a) 0.5 wt % and (b) 0.75 wt %. The scale bar denotes a length of 50 μm.
Figure 13:
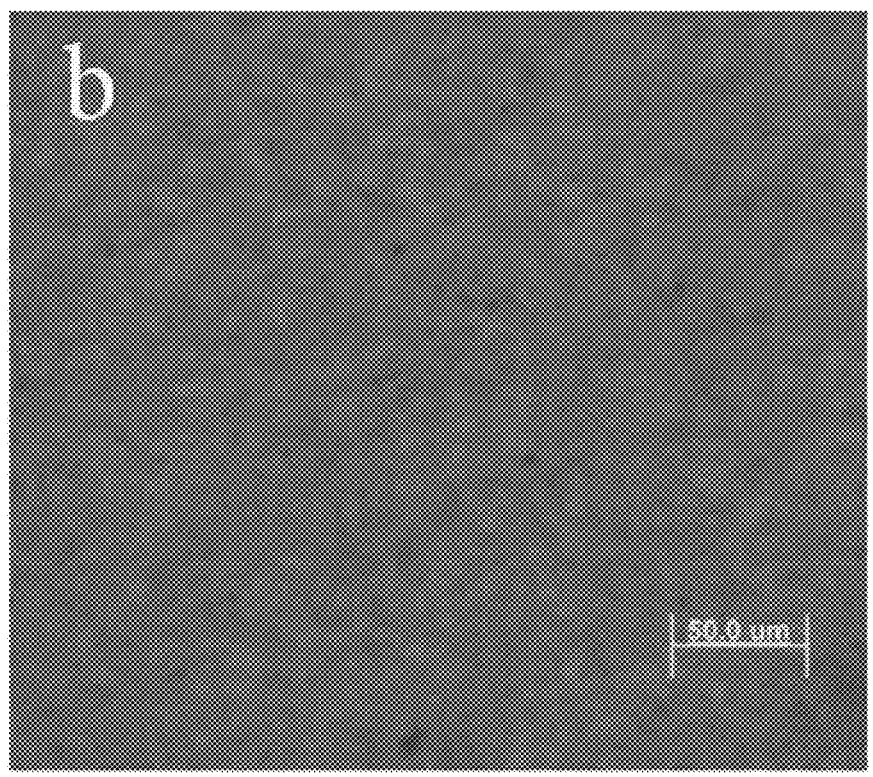

FIGS. 8e and 8f show representative photographs of composite films containing 0.25 wt % and 30 wt % MWNTs. The composite with 0.25 wt % MWNTs possesses good transparency and uniformity, while the composite with 30 wt % MWNTs is completely opaque. FIG. 13 are optical micrographs of MWNT/PI composite films with MWNT loadings of (a) 0.5 wt % and (b) 0.75 wt %. Even under 200× magnification in optical microscopy, no visible aggregates were observed in the MWNT/PI composite films, indicating homogeneous MWNT dispersion throughout the matrix.

To further examine the nanotube dispersion in composite film, MWNT (1 wt %)/PAA film without thermal imidization was redispersed in DMAc with shaking by hands only. This dispersion was then filtered through a 0.2-μm $Al_2O_3$ membrane and washed with a large quantity of DMAc to remove free polymer.

Figure 14:
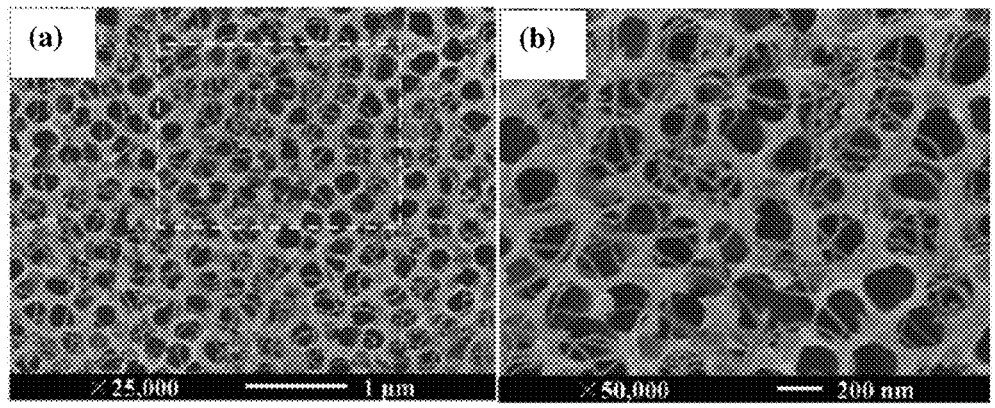
FIG. 14 are Field Emission Scanning Electron Microscope (FE-SEM) images of MWNTs: (a) MWNT (1 wt %)/PAA composite film on 0.2-μm $Al_2O_3$ filter membranes after removal of free polymer, and (b) enlarged image of a selected region in panel a. FE-SEM images of the MWNTs on the $Al_2O_3$ membrane show that the MWNTs are well-dispersed without significantly reduced length. The scale bar in (a) denotes a length of 1 μm, and the scale bar in (b) denotes a length of 200 nm.

FIG. 14 are Field Emission Scanning Electron Microscope (FE-SEM) images of MWNTs: (a) MWNT (1 wt %)/PAA composite film on 0.2-μm $Al_2O_3$ filter membranes after removal of free polymer, and (b) enlarged image of a selected region in panel a. FE-SEM images of the MWNTs on the $Al_2O_3$ membrane show that the MWNTs are well-dispersed without significantly reduced length. The diameter of MWNTs, which were coated with a layer of gold before FE-SEM observation, is about 14 nm to 20 nm. This value is only 4 nm to 5 nm larger than that of pristine MWNTs (10 nm to 15 nm), indicating that MWNTs in FIG. 14 are dispersed individually. Experiments carried out have confirmed that MWNTs cannot be dispersed by PAA with only hand shaking, as MWNT aggregates can be observed by eyes, so FIG. 14 exhibits the nanotube dispersion state in composite film. The nanotube morphology in FIG. 14 suggests that MWNTs can generate a conductive network for electron transport, leading to high electrical conductivity for the final MWNT/PI composite film, which will be discussed below.

Figure 15:
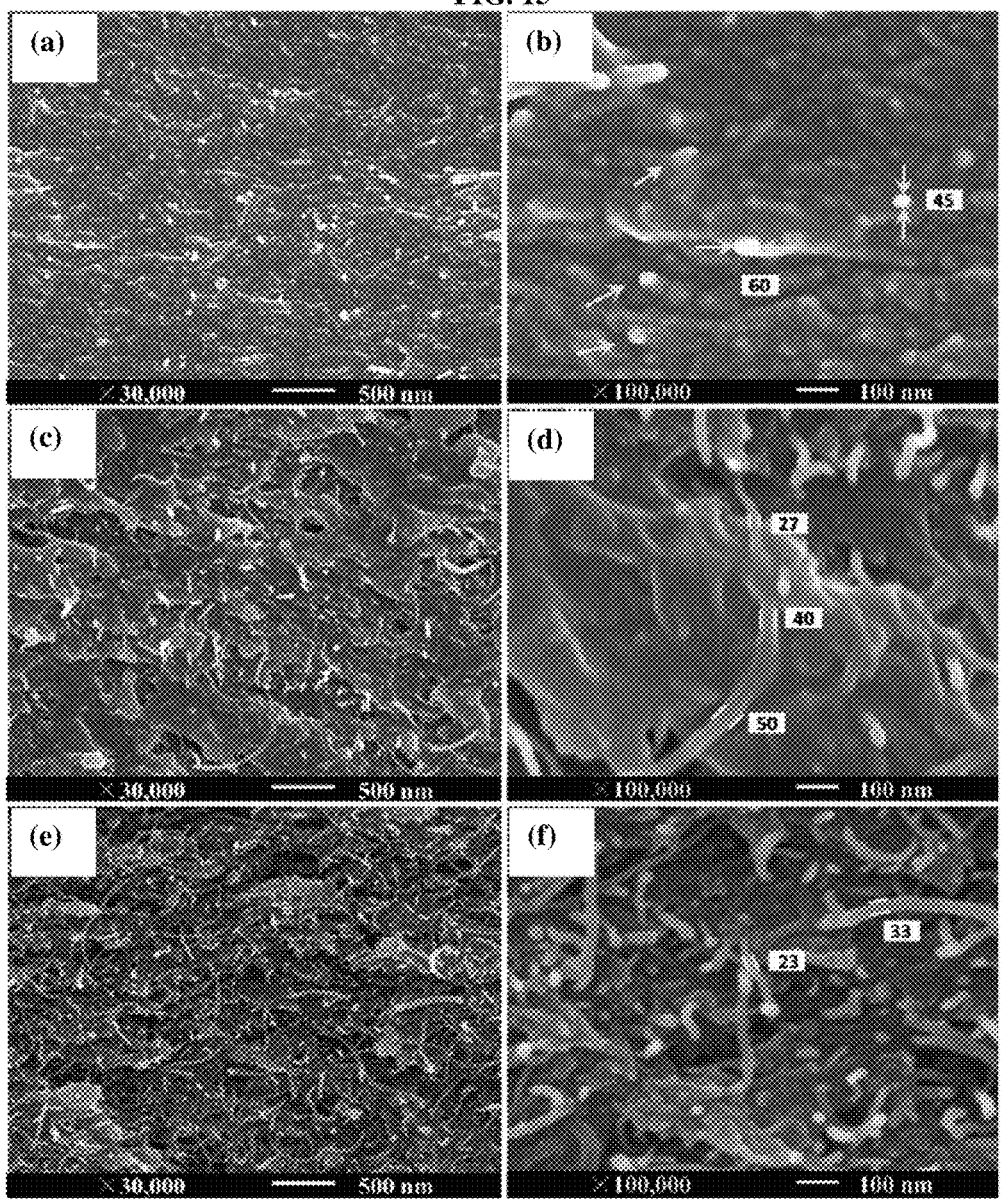
FIG. 15 are FE-SEM images of cryofractured surfaces of MWNT/PI composite films with MWNT loadings of (a and b) 1 wt %, (c and d) 10 wt %, and (e and f) 30 wt %. Images to the right (panels b, d, and f) show enlarged views of selected areas in the images to the left (panels a, c, and e). The scale bar in (a), (c) and (e) denotes a length of 500 nm, while the scale bar in (b), (d) and (f) denotes a length of 100 nm.

To investigate the dispersion and morphology of nanotubes in fully imidized MWNT/PI composites, composite films were dipped into liquid nitrogen and then broken. FE-SEM images of cryofractured surfaces of composites with nanotube contents of 1 wt %, 10 wt %, and 30 wt % are shown in FIG. 15. For all three loadings, MWNTs are dispersed homogeneously throughout the surfaces without any obvious aggregates (FIGS. 15a to 15f). With 1 wt % MWNTs (FIGS. 15a and 15b), MWNTs are broken on the surface (indicated by arrows), suggesting strong polymer-nanotube interfacial adhesion. The diameter of the MWNTs in FIG. 15b (about 40 nm to 60 nm) is much larger than that in MWNT (1 wt %)/PAA composite after removal of polymer (about 14 nm to 20 nm; see FIG. 14b), suggesting a thick cladding of polymer on the surface of the nanotube. The FE-SEM images of MWNT (10 wt %)/PI materials (FIGS. 15c and 15d) reveal more MWNTs on the surface, compared to the MWNT (1 wt %)/PI sample. Some MWNTs are partially pulled out from the surface, but most MWNTs are broken on the surface and well-wetted by the PI matrix, which is again reflected in the large diameter of the polymer-clad nanotubes (see FIG. 15d). As the MWNT content increases to 30 wt % (FIGS. 15e and 15f), there are more MWNTs "competing" for the matrix, leading to less polymer cladding on the MWNT surface, as reflected in the reduced diameters of the polymer-clad MWNTs (about 18 nm to 33 nm) and, consequently, more pulled-out MWNTs.

Figure 16:
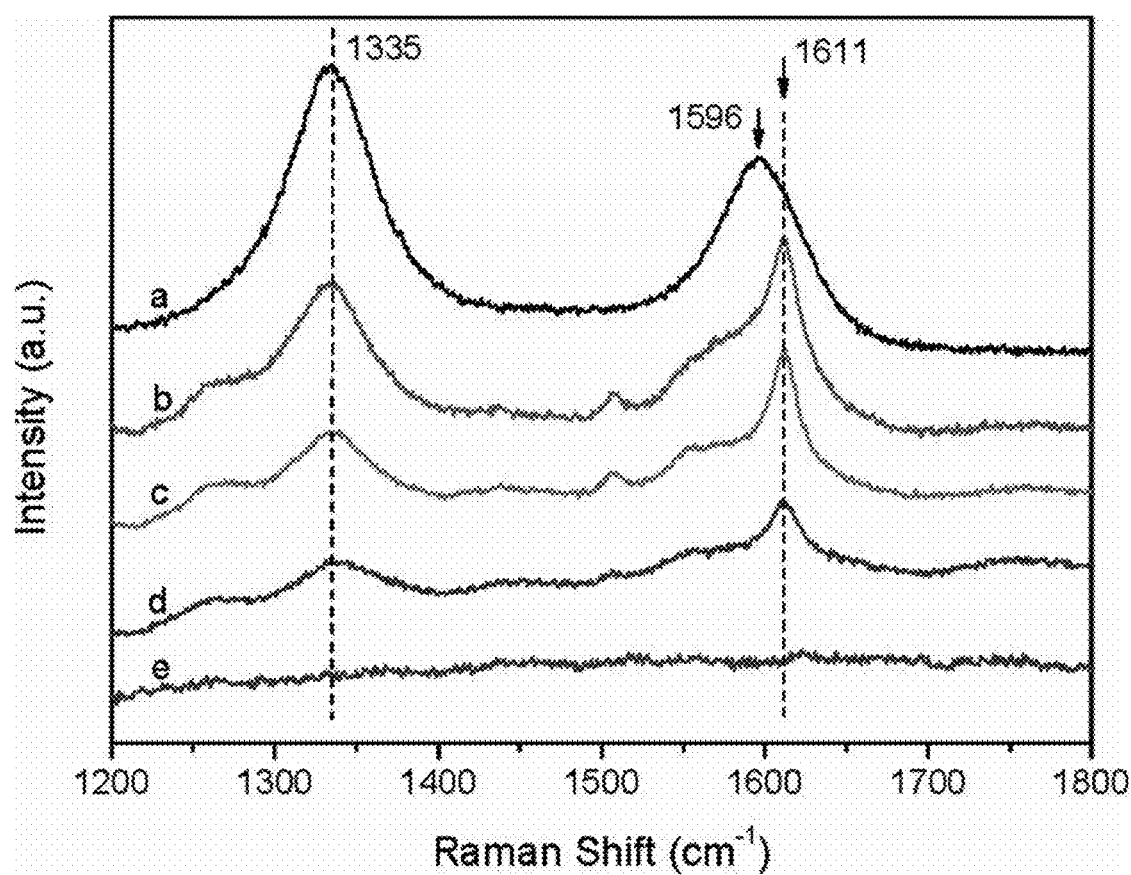
FIG. 16 is a graph showing Raman spectra of (a) pristine MWNTs, and MWNT/PI composites with MWNT loadings of (b) 30 wt %, (c) 20 wt %, (d) 10 wt %, and (e) 5 wt %.

It has been shown that the wrapping of polymer around nanotubes can result in a shift toward higher frequencies of the peak of the tangential vibrational mode (G-band), because of charge transfer from the CNTs to the polymer dispersant. FIG. 16 shows the Raman spectra of pristine MWNTs and MWNT/PI composites with nanotube contents of 30 wt %, 20 wt %, 10 wt %, and 5 wt %. The disorder mode (D-band) and the tangential mode (G-band) of MWNTs are seen at about 1335 cm$^{-1}$ and about 1600 cm$^{-1}$, respectively. The G-band peak of pristine MWNTs is located at 1596 cm$^{-1}$ (spectrum a), while that of MWNT/PI composites with a MWNT content of 10 wt % to 30 wt % are located at about 1611 cm$^{-1}$ (spectra b to d). The observed 15 cm$^{-1}$ Raman upshift in MWNT/PI composites confirms the presence of strong π-π interaction between PI and MWNTs. Moreover, the Raman peaks become less distinct as the MWNT content in composites decreases from 30 wt % to 10 wt %. In MWNT/PI composites with nanotube loadings of 0.25 wt % to 5 wt %, the Raman spectra features are overwhelmed by the strong broad luminescence background and the characteristic peaks of MWNTs are undetectable (here, only the spectrum of the 5 wt % MWNT sample, spectrum e is shown), which has also been observed in other functionalized CNTs. It has been suggested that better nanotube dispersion enhances the luminescence, leading to more-significant interference in Raman measurements. Thus, the strong luminescence observed in the composites with 0.25 wt % to 5 wt % MWNTs suggests good nanotube dispersion without significant aggregation.

Example 9: Electrical Conductivity of CNT/PI composites, CNTs are modified by acid treatment, which has been shown to reduce CNT intrinsic electrical conductivity, because of the introduced structural defects. Furthermore, decreased nanotube length and aspect ratio of acid-treated CNTs lead to a higher CNT fraction needed to form a continuous charge carrier channel in composites. As a result, relatively high percolation thresholds were observed in these studies. In the method used presently, the designed PAA molecular chains are adsorbed onto the MWNT surface to disperse nanotube bundles into individuals without any substantial damage to the MWNT length and structure. The original aspect ratio and intrinsic electrical properties of the MWNTs are better preserved. Compared to other reported methods, the MWNTs used herein are better suited to form a conducting interconnected nanotube network in the polymer matrix, and the low nanotube loading threshold may be attributed to the formation of a conductive network.

Moreover, the absolute conductivities of the MWNT/PI composites obtained herein are much higher than the reported values of CNT/PI composites with the same nanotube loading. For example, for nanotube/polyimide composites with 5 wt % nanotubes, the reported conductivities are in the range of $10^{-9}$ S cm$^{-1}$ to $10^{-4}$ S cm$^{-1}$, which are about 3 to 8 orders of magnitude lower than the present value of

TABLE 1

Mechanical and Electrical Properties of Neat PI and MWNT/PI Composite Films

| CNT loading [wt %] | CNT loading [vol %] | Modulus [GPa] | Strength [MPa] | Elongation [%] | Conductivity [S cm$^{-1}$] |
|---|---|---|---|---|---|
| 0 | 0 | 6.37 ± 0.13 | 151.2 ± 5.1 | 4.5 ± 0.2 | 3.5 × 10$^{-16}$ |
| 0.25 | 0.16 | 7.30 ± 0.09 | 175.0 ± 6.3 | 6.2 ± 0.3 | 6.8 × 10$^{-16}$ |
| 0.5 | 0.33 | 7.68 ± 0.12 | 188.1 ± 3.4 | 5.9 ± 0.4 | 8.3 × 10$^{-8}$ |
| 0.75 | 0.49 | 8.15 ± 0.09 | 193.6 ± 6.5 | 5.6 ± 0.2 | 7.2 × 10$^{-5}$ |
| 1 | 0.65 | 8.47 ± 0.17 | 206.7 ± 6.8 | 5.4 ± 0.3 | 5.6 × 10$^{-4}$ |
| 2 | 1.31 | 8.88 ± 0.11 | 215.4 ± 5.2 | 5.0 ± 0.3 | 1.8 × 10$^{-2}$ |
| 5 | 3.31 | 9.21 ± 0.07 | 221.3 ± 6.3 | 4.4 ± 0.3 | 0.27 |
| 10 | 6.75 | 9.55 ± 0.12 | 228.4 ± 5.2 | 4.1 ± 0.2 | 3.5 |
| 20 | 14.00 | 9.97 ± 0.13 | 206.6 ± 4.0 | 3.2 ± 0.1 | 13.3 |
| 30 | 21.82 | 9.43 ± 0.14 | 179.2 ± 9.7 | 2.5 ± 0.3 | 38.8 |

Figure 17:
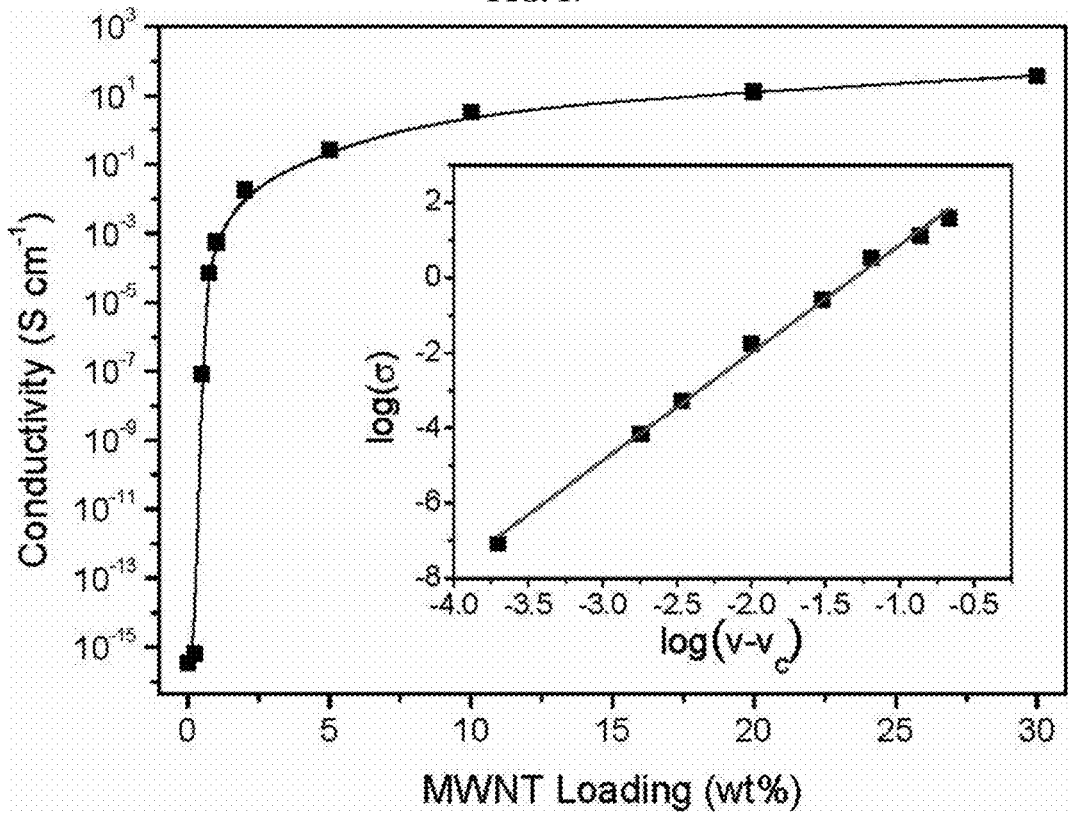
FIG. 17 is a graph showing log Direct Current (DC) conductivity, measured at room temperature, as a function of MWNT mass fraction for MWNT/PI composites. The inset shows the best fit to the conductivity data using the equation described in the text for the determination of percolation threshold.

FIG. 17 and Table 1 show the DC conductivity of MWNT/PI composites, measured at room temperature, as a function of MWNT loading. The conductivity of neat PI is 3.5×10$^{-16}$ S cm$^{-1}$ and no obvious increase is observed with the addition of 0.25 wt % MWNTs. As the MWNT loading increases from 0.25 wt % to 0.5 wt %, the conductivity exhibits a sharp increase of about 8 orders of magnitude, from 6.8× 10$^{-16}$ S cm$^{-1}$ to 8.3×10$^{-8}$ S cm$^{-1}$, indicating the formation of a percolating network. Percolation theory predicts that the composite conductivity versus nanotube volume fraction obeys the power law:

$$\sigma \propto (v-v_c)^t \text{ for } v > v_c \qquad \text{Equation (2)}$$

where σ is the composite conductivity, v the nanotube volume fraction, $v_c$ the percolation threshold, and t the critical exponent.

The best fit of experimental electrical conductivity data to the above equation gives a value of $v_c$=0.31 vol % (i.e. 0.48 wt %) and t=2.8 with a correlation coefficient of 0.9954, as shown in the plot of log(G) versus log(v−$v_c$) in the inset in FIG. 17.

The percolation threshold obtained (0.48 wt %) is much lower than most reported values for CNT/polyimide composites (>1 wt %). In most reported methods of preparation about 0.27 S cm$^{-1}$. Demonstrated conductivity value reaches 13.3 S cm$^{-1}$ at 20 wt % MWNT loading and 38.8 S cm$^{-1}$ at 30 wt % MWNT loading, which is about 17 orders of magnitude higher than that of neat PI. These values are the highest values reported yet for CNT/PI composites. The electrical conductivity of the composite with 30 wt % MWNTs (38.8 S cm$^{-1}$), to the best of our knowledge, is the highest value ever reported for a solution processed nanotube composite. The electrical conductivity of our MWNT/PI composites is tunable from 10$^{-16}$ S cm$^{-1}$ to 38.8 S cm$^{-1}$ by varying the nanotube content. At a loading of 0.75 wt %, the conductivity reaches 7.2×10$^{-5}$ S cm$^{-1}$, which satisfies the requirements of electrostatic dissipation applications (10$^{-5}$ S cm$^{-1}$). The conductivity of the composite with 5 wt % MWNTs (0.27 S cm$^{-1}$) is adequate for electromagnetic interference (EMI) shielding applications (0.1 S cm$^{-1}$).

Example 10: Mechanical Properties

Figure 18:
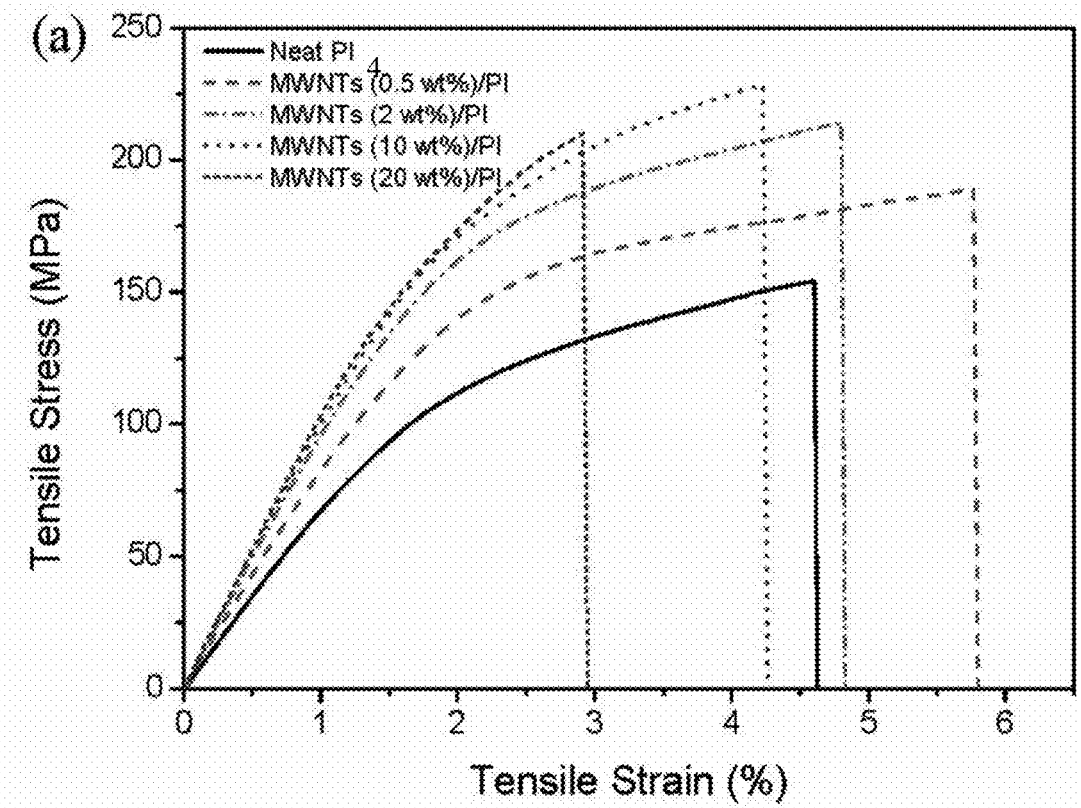
FIG. 18 are graphs showing (a) representative stress-strain curves of neat PI and MWNT/PI composites with MWNT loadings of 0.5 wt %, 2 wt %, 10 wt %, and 20 wt %; comparison of (b) Young's modulus and (c) tensile strength of composites prepared in this study with published values for other CNT/PI composites. The tensile data for other CNT/PI composites were reprinted with permission from these noted references.
Figure 18:
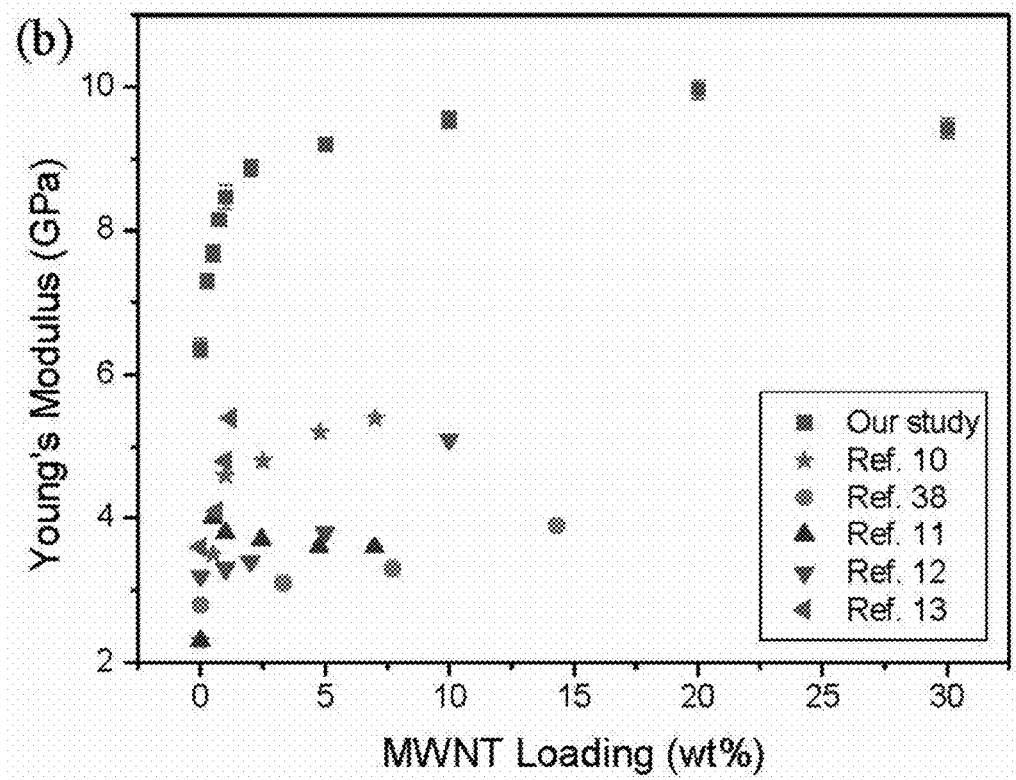
Figure 18:
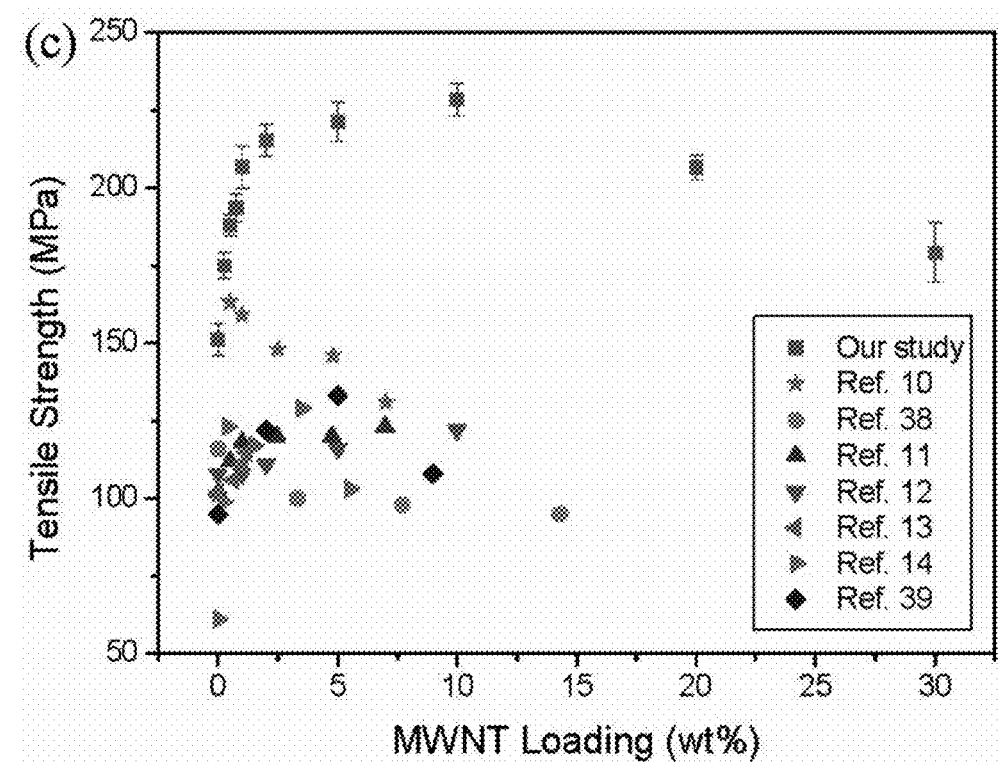

The tensile properties of neat PI and MWNT/PI composite films with various MWNT loadings are summarized in Table 1 and FIG. 18. FIG. 18a presents representative stress-strain curves. For neat PI films, the tensile modulus is 6.37±0.13 GPa and the strength is 151.2±5.1 MPa.

The reported tensile values of polyimide vary widely, since they are dependent on the diamine and dianhydride used. Modulus and strength values of the composite films demonstrated herein are in the higher end of the published range, because of the rigid monomers used.

As shown in FIGS. 10b and 10c, an increase in MWNT loading from 0 wt % to 10 wt % leads to a continuous increase of both tensile modulus and strength. Increasing the MWNT loading further to 20 wt % and 30 wt % results in a decrease in tensile modulus and strength. This can be attributed to the reduced distance between nanotubes (FIG. 7f), which causes highly intensified stress field between the closely spaced nanotubes and increased free volume. However, the MWNT (30 wt %)/PI composite still has improved tensile properties (with a modulus of 9.43±0.14 GPa and a strength of 179.2±9.7 MPa), compared to the unreinforced matrix (with respective values of 6.37±0.13 GPa and 151.2±5.1 MPa). FIGS. 10b and 10c also show comparison of tensile properties of the composite films obtained with the values recently reported in the literature for CNT/PI composites. Absolute tensile values at all nanotube loadings investigated (6 GPa to 10 GPa, and 151 MPa to 228 MPa) are higher than the reported Young's modulus and tensile strength of other CNT/PI composites, which are in the range of 3 GPa to 5 GPa and 100 MPa to 130 MPa, respectively.

Without wishing to be bound by any particular theory, the inventors believe that the excellent electrical conductivity and mechanical properties achieved in this study are due to the high CNT dispersion efficacy of the designed PAA, which functions both as the polymer matrix precursor and as the nanotube dispersant. The PAA has good affinity for the nanotubes and also good solubility in the solvent. It is able to interact non-covalently with nanotube surface without severe damage to their length and conjugated $\pi$ system. A single polymer functioning as both a matrix precursor and a dispersant may avoid any incompatibility issue between the matrix and the dispersant, such as that which has been encountered in some other studies. As a result, high mechanical properties may be obtained for the composite with high nanotube loading. The MWNTs can be uniformly dispersed throughout the PI matrix at high nanotube content, leading to more effective electrical network formation and increased electrical conductivity.

Example 11: MWNT/PI Coatings

Besides highly electrically conductive and mechanically strong free-standing composite films, the PAA functionalized MWNT dispersions can also be used to fabricate composite coatings on various substrates. FIG. 2g shows a transparent coating of MWNT (30 wt %)/PI on a glass substrate prepared via the spraying process. The measured transmittance of this coating is 81%±0.4% at 550 nm, which is calculated based on 10 transmission scans of this coating at different spots. The extremely low standard deviation, compared to the mean transmittance value, indicates the very high uniformity of our composite coating. Similar ultrathin composite coating (several hundreds of nm) can also be deposited on an aluminum substrate. Thicker coatings (given in micrometers) on aluminum (see FIG. 2h) can be prepared by solution casting, because of their excellent adhesion to aluminum. Unlike neat nanotube coatings, which may be peeled off because of their weak adhesion to the substrates, our composite coatings have good stability and can be easily handled. Combined with their high electrical conductivity (about 38.8 S cm$^{-1}$), as well as high temperature resistance and good chemical-resistant properties, they may have wide applications in electronics and aerospace industries.

In summary, a rigid hydroxyl-functionalized poly(amic acid) (PAA), which is the precursor of polyimide, has been synthesized. Its ability to perform the dual functions of a highly effective dispersant of MWNTs and a matrix material for polymer/MWNT composites has been demonstrated. MWNT/PI composite films made by the conventional solution casting technique with this dual-function PAA show outstanding electrical properties. The electrical conductivity of the composites reaches 38.8 S cm$^{-1}$ at a MWNT loading of 30 wt % and the nanotube concentration for the percolation threshold of conductivity of MWNT/PI composites is 0.48 wt %, which are, respectively, the highest and among the lowest reported values for any conventional solution processed nanotube composites. The 30 wt % MWNT composite has higher Young's modulus (9.43±0.14 GPa) and tensile strength (179.2±9.7 MPa) values than common polyimides. This is also the first report of MWNT/PI composites with MWNT loadings as high as 30 wt % made by the solution casting technique. The excellent electrical and mechanical properties, combined with the facile fabrication technique, make this MWNT/PI composite a promising material for many potential applications, such as electrostatic dissipation, electromagnetic interference shielding, and flexible printed circuit boards. Uniform and stable MWNT (30 wt %)/PI composite coatings have also been deposited on glass and aluminum substrates.

Further Embodiments

1. A method for forming a polyimide-carbon nanotube composite film on a substrate, the method comprising
   a) suspending carbon nanotubes in a solution comprising a poly(amic acid) and a suitable solvent, the poly(amic acid) having the chemical formula (I)

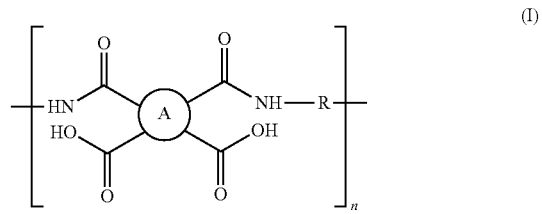

wherein

A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted;

R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and n is an integer of at least 20;

b) casting the solution onto a substrate to form a layer on the substrate; and c) heating the layer to convert the poly(amic acid) into a polyimide to form the polyimide-carbon nanotube composite film.

2. The method according to clause 1, wherein the poly(amic acid) has the chemical formula (II)

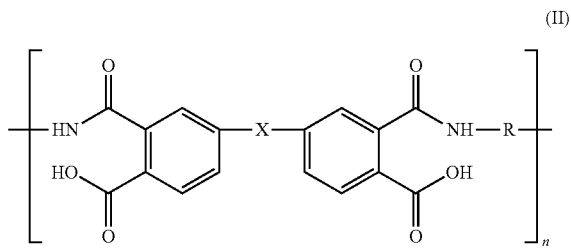

wherein
X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_5$-$C_{10}$ aryl, and a heteroatom selected from oxygen, sulfur and nitrogen;
R is nothing, a substituted or unsubstituted monocyclic, condensed or bridged $C_5$-$C_{20}$ aryl; and
n is an integer of at least 20.

3. The method according to clause 2, wherein X is a direct bond.
4. The method according to clause 2, wherein R is a carboxyl substituted aryl or a hydroxyl substituted aryl.
5. The method according to clause 4, wherein R is

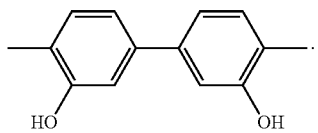

6. The method according to clause 1, wherein the molecular weight of the poly(amic acid) is about $1 \times 10^5$ g/mol to about $2.5 \times 10^5$ g/mol.
7. The method according to clause 1, wherein the polyimide comprises

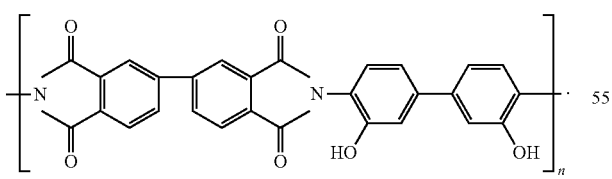

8. The method according to clause 1, wherein the carbon nanotubes comprise multi-walled carbon nanotubes.
9. The method according to clause 1, wherein the amount of carbon nanotubes in the solution is about 0.1 wt % to about 30 wt %.
10. The method according to clause 1, wherein the solvent is selected from the group consisting of N-N'-dimethylacetamide (DMAc), N,N-dimethylformamide (DMF), N-methylpyrrolidinone (NMP), tetrahydrofuran (THF), acetone, dimethyl sulfoxide (DMSO), and mixtures thereof.
11. The method according to clause 1, wherein heating comprises
(a) drying the layer at a temperature of about 50° C. to about 100° C. to remove the solvent; and
(b) heating the layer at a temperature of about 100° C. to about 350° C. to imidize the poly(amic acid) to polyimide.
12. The method according to clause 1, further comprising agitating the solution prior to step b).
13. The method according to clause 12, wherein agitating comprises sonicating the solution for more than 5 minutes.
14. A polyimide-carbon nanotube composite film formed by the method according to clause 1.
15. A polyimide-carbon nanotube composite film comprising carbon nanotubes and a polyimide having the chemical formula (III)

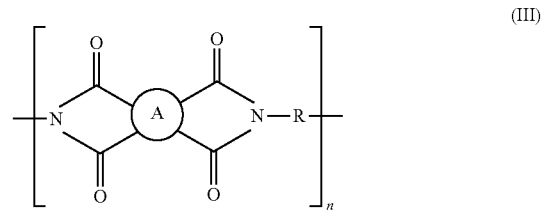

wherein
A is selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted;
R is nothing, C=O, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted monocyclic, condensed or bridged $C_5$-$C_{20}$ aryl; and
n is an integer of at least 20.
16. The polyimide-carbon nanotube composite film according to clause 15, wherein the polyimide has the chemical formula (IV)

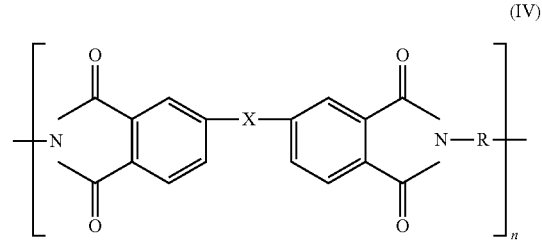

wherein
X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_5$-$C_{10}$ aryl, and a heteroatom selected from oxygen, sulfur and nitrogen;

R is nothing, a substituted or unsubstituted monocyclic, condensed or bridged $C_5$-$C_{20}$ aryl; and n is an integer of at least 20.

17. The polyimide-carbon nanotube composite film according to clause 16, wherein X is a direct bond.

18. The polyimide-carbon nanotube composite film according to clause 16, wherein R is a carboxyl substituted aryl or a hydroxyl substituted aryl.

19. The polyimide-carbon nanotube composite film according to clause 18, wherein R is

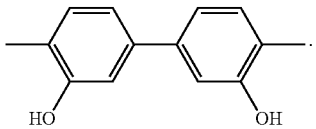

20. The polyimide-carbon nanotube composite film according to clause 15, wherein the polyimide comprises

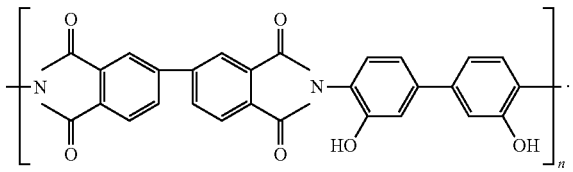

21. The polyimide-carbon nanotube composite film according to clause 15, wherein the carbon nanotubes comprise multi-walled carbon nanotubes.

22. The polyimide-carbon nanotube composite film according to clause 15, wherein the amount of carbon nanotubes in the composite is about 0.1 wt % to about 30 wt %.

23. The polyimide-carbon nanotube composite film according to clause 15, wherein the amount of carbon nanotubes in the composite is about 30 wt %.

24. The polyimide-carbon nanotube composite film according to clause 15, wherein the polyimide interacts noncovalently with the carbon nanotubes.

25. An electronic device comprising a polyimide-carbon nanotube composite film according to any one of clauses 14 to 24.

The invention claimed is:

1. A polyimide-carbon nanotube composite film comprising a) a carbon nanotube, and
b) a polyimide obtainable by imidizing a poly(amic acid) having the following chemical formula

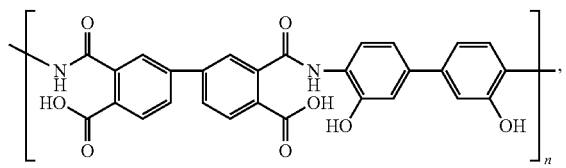

wherein n is an integer; and the poly(amic acid) has a weight-average molecular weight ($M_w$) of $1.97 \times 10^5$ g/mol with a polydispersity index of 1.96.

2. The polyimide-carbon nanotube composite film according to claim 1, wherein the polyimide is obtainable by imidizing the poly(amic acid) at a temperature in the range of about 100° C. to about 350° C.

3. The polyimide-carbon nanotube composite film according to claim 1, wherein the polyimide comprises

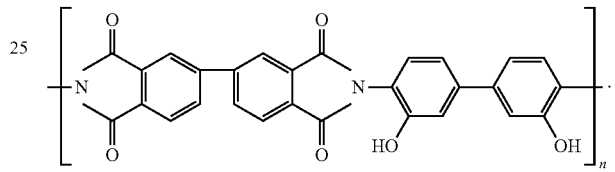

4. The polyimide-carbon nanotube composite film according to claim 1, wherein the carbon nanotubes comprise multi-walled carbon nanotubes.

5. The polyimide-carbon nanotube composite film according to claim 4, wherein the multi-walled carbon nanotubes has a diameter in the range of about 10 nm to about 15 nm.

6. The polyimide-carbon nanotube composite film according to claim 4, wherein the multi-walled carbon nanotubes has a length in the range of about 10 μm to about 20 μm.

7. The polyimide-carbon nanotube composite film according to claim 1, wherein amount of carbon nanotubes in the polyimide-carbon nanotube composite film is about 0.25 wt % to about 30 wt %.

8. The polyimide-carbon nanotube composite film according to claim 1, wherein amount of carbon nanotubes in the polyimide-carbon nanotube composite film is about 30 wt %.

9. The polyimide-carbon nanotube composite film according to claim 1, wherein the polyimide-carbon nanotube composite film is arranged on a substrate.

10. The polyimide-carbon nanotube composite film according to claim 9, wherein the substrate is a glass substrate or an aluminum substrate.

* * * * *